United States Patent
Behera et al.

(10) Patent No.: US 11,780,014 B2
(45) Date of Patent: Oct. 10, 2023

(54) AUTO-TEMPERING STEELS FOR ADDITIVE MANUFACTURING

(71) Applicant: QUESTEK INNOVATIONS LLC, Evanston, IL (US)

(72) Inventors: Amit Behera, Evanston, IL (US); Greg Olson, Evanston, IL (US)

(73) Assignee: QUESTEK INNOVATIONS LLC, Evanston, IL (US)

( * ) Notice: Subject to any disclaimer, the term of this patent is extended or adjusted under 35 U.S.C. 154(b) by 109 days.

(21) Appl. No.: 17/186,556

(22) Filed: Feb. 26, 2021

(65) Prior Publication Data

US 2021/0332465 A1 Oct. 28, 2021

Related U.S. Application Data

(60) Provisional application No. 63/015,802, filed on Apr. 27, 2020.

(51) Int. Cl.
| | |
|---|---|
| B33Y 70/00 | (2020.01) |
| C22C 38/00 | (2006.01) |
| B22F 10/20 | (2021.01) |
| B22F 10/64 | (2021.01) |
| B22F 10/28 | (2021.01) |
| B22F 9/08 | (2006.01) |
| C22C 38/04 | (2006.01) |

(Continued)

(52) U.S. Cl.
CPC ............ B22F 10/20 (2021.01); B22F 1/00 (2013.01); B22F 9/08 (2013.01); B22F 10/28 (2021.01); B22F 10/64 (2021.01); B33Y 70/00 (2014.12); C22C 38/005 (2013.01); C22C 38/04 (2013.01); C22C 38/50 (2013.01); C22C 38/54 (2013.01); B22F 2301/35 (2013.01); B22F 2303/01 (2013.01)

(58) Field of Classification Search
CPC ..................................................... C22C 38/54
See application file for complete search history.

(56) References Cited

U.S. PATENT DOCUMENTS

| | | |
|---|---|---|
| 3,496,034 A | 2/1970 | Alger et al. |
| 4,826,543 A | 5/1989 | Yano et al. |
| | (Continued) | |

FOREIGN PATENT DOCUMENTS

| | | | |
|---|---|---|---|
| CA | 2164138 A | * 6/1996 | ............ B22F 1/0003 |
| DE | 3541620 A1 | 6/1986 | |
| | (Continued) | | |

OTHER PUBLICATIONS

Zhu Xu-xiang, Liu Dong-sheng "Microstructure and Mechanical Properties of a Low Carbon 7.7% Ni Steel Subjected to Intercritical Quenching" Iron and Steel Gangtie Bianjibu (2013) 48(11), 72-78, CODEN: KATIAR; ISSN: 0449-749X. (Year: 2013).*

European Patent Office Extended Search Report for Application No. 21159760.4 dated Jul. 28, 2021 (9 pages).

Kasuya et al., "Carbon Equivalent to Assess Hardenability of Steel and Prediction of HAZ Hardness Distribution", Nippon Steel Technical Report No. 95, Jan. 2007, pp. 53-61.

(Continued)

*Primary Examiner* — Alexandra M Moore
(74) *Attorney, Agent, or Firm* — Michael Best & Friedrich LLP

(57) ABSTRACT

Exemplary martensitic steel alloys may be particularly suited for additive manufacturing applications. Exemplary atomized alloy powders usable in additive manufacturing may include carbon, nickel, manganese, chromium, and the balance iron and incidental impurities. Exemplary steel alloys can be molybdenum free.

18 Claims, 17 Drawing Sheets

(51) Int. Cl.
*C22C 38/50* (2006.01)
*C22C 38/54* (2006.01)
*B22F 1/00* (2022.01)

(56) References Cited

U.S. PATENT DOCUMENTS

| | | | |
|---|---|---|---|
| 9,499,890 | B1 | 11/2016 | Zhang |
| 2007/0251609 | A1 | 11/2007 | Saha et al. |
| 2015/0147222 | A1* | 5/2015 | Miura ..................... C22C 38/06 420/83 |
| 2016/0251736 | A1 | 9/2016 | Shimizu |

FOREIGN PATENT DOCUMENTS

| | | |
|---|---|---|
| GB | 963220 A | 7/1964 |
| RU | 2703008 C1 | 10/2019 |

OTHER PUBLICATIONS

Garrison, Jr. et al., "Lanthanum additions and the toughness of ultra-high strength steels and the determination of appropriate lanthanum additions", Materials Science and Engineering A 403, 2005, pp. 299-310.

Wang et al., "Prediction of the yield strength of a secondary-hardening steel", Acta Materialia, vol. 61, Issue 13, 2013, pp. 4939-4952.

Zhu et. al., "Carbide characterization in low-temperature tempered steels", Ultramicroscopy, vol. 109, 2009, pp. 545-552.

Speich, "Secondary Hardening Ultrahigh Strength Steels", Innovations in Ultrahigh-strength Steel Technology, ed. by Olson et al., Proceedings of the 34th Sagamore Army Materials Research Conference, 1987, p. 89-111.

* cited by examiner

AUTO-TEMPERING STEELS FOR ADDITIVE MANUFACTURING

CROSS-REFERENCE TO RELATED APPLICATION

The present application is related to and claims the priority benefit of U.S. Provisional Patent Application No. 63/015,802, filed Apr. 27, 2020, the entire contents of which are incorporated herein by reference.

GOVERNMENT INTEREST

This invention was made with government support under N00014-17-1-2565 to QuesTek Innovations LLC awarded by the Office of Naval Research. The government has certain rights in the invention.

TECHNICAL FIELD

The present disclosure relates to materials, methods and techniques for martensitic steel alloys. Exemplary low carbon steel alloys comprising nickel (Ni) may be suited for direct-printed additive manufacturing implementations and may be high strength and high toughness.

INTRODUCTION

Additive manufacturing (AM) is a process of fabricating components in a layer-by-layer method under the control of computer-aided design (CAD) information, rather than by the traditional use of casting molds and forming dies. Metal additive manufacturing technologies such as Selective Laser Melting (SLM), also known as Laser Powder Bed Fusion (LPBF), have matured significantly in recent years.

By allowing for net-shape fabrication of highly complex geometries without molds or machining, additive manufacturing offers the potential to reduce material usage, energy consumption, component cost, and fabrication time. Additive manufacturing allows for rapid component production, one-off production of difficult-to-source parts, and production of parts difficult to produce by conventional means (such as complex geometries that cannot be machined or cast). As a result, additive manufacturing can provide flexibility in part manufacturing to original equipment manufacturers as well as end users acquiring custom or replacement parts.

SUMMARY

Materials, methods and techniques disclosed and contemplated herein relate to martensitic steel alloys that are particularly adapted for additive manufacturing applications. In some instances, steel alloys can be molybdenum free and can include carbon, nickel, manganese, chromium, and the balance iron and incidental elements and impurities.

In one aspect, an alloy is disclosed. In some instances, the alloy can include, by weight, 0.05% to 0.15% carbon, 5.0% to 10.0% nickel, 0.2% to 1.0% manganese, 0.5% to 1.5% chromium, less than 0.001% molybdenum, and the balance iron and incidental impurities.

In another aspect, an atomized alloy powder usable in additive manufacturing is disclosed. The atomized alloy powder can include alloy particles that include, by weight, 0.05% to 0.15% carbon, 5.0% to 10.0% nickel, 0.2% to 1.0% manganese, 0.5% to 1.5% chromium, less than 0.001% molybdenum, and the balance iron and incidental impurities.

In another aspect, a method of performing additive manufacturing is disclosed. The method can include conducting additive manufacturing with an atomized alloy powder to generate a manufactured article. The atomized alloy powder can include alloyed particles comprising, by weight percentage, 0.05% to 0.15% carbon, 5.0% to 10.0% nickel, 0.2% to 1.0% manganese, 0.5% to 1.5% chromium, less than 0.001% molybdenum, and the balance iron and incidental impurities. The method can also include removing a completed manufactured article.

There is no specific requirement that a material, technique or method relating to steel alloys include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
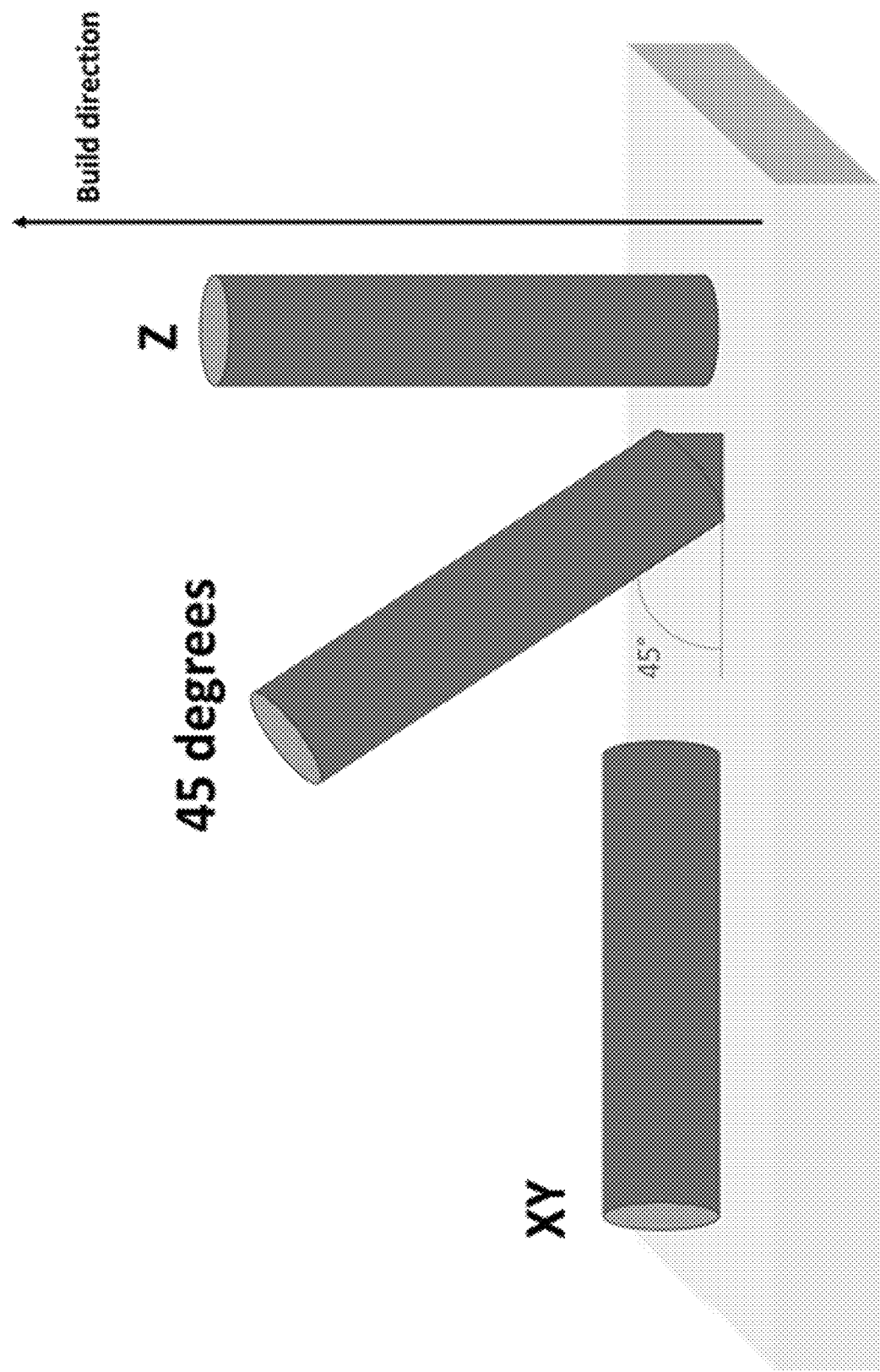
FIG. 1 shows schematic depictions of an "xy" build, a "z" build, and a "45°" build for experimental samples.

Materials, methods and techniques disclosed and contemplated herein relate to martensitic steel alloys. Alloys disclosed and contemplated herein are particularly suited for additive manufacturing applications. For instance, an atomized alloy powder usable in additive manufacturing can include alloy particles comprising various alloys disclosed and contemplated herein.

Many metal AM parts require extensive heat treatments of the part after the build process in order to achieve target properties, which can increase lead time, part cost, and capital requirements. The ability to use an AM part in the as-built condition would enable the potential for use in environments with minimal access to post-processing equipment. In the as-built condition, it is highly challenging to achieve the high-performance requirements of critical AM manufactured components due to the rapid melting/solidification and complex heat cycle undergone by the built material. Utilization of these rapid solidification effects and complicated thermal cycles undergone by the material under an additive manufacturing process can be used to enhance its as-built properties and thus can readily increase the demand for its industrial application.

High-strength and high-toughness LPBF steels have been identified as promising candidates for temporary replacements for difficult to acquire components in various naval applications. Navy 10Ni steel is a regarded as a promising candidate, however Navy 10Ni is an alloy designed for wrought applications and requires secondary heat treatment to reach its optimal performance. The secondary heat treatment can promote precipitation of stable $(Mo, V)_2C$ carbides that may provide improved mechanical properties. Exemplary alloys can be high-strength, high toughness steels in as-printed additively manufactured condition without the need of any secondary heat treatment. Exemplary alloy microstructure can be primarily martensitic with precipitation of nanoscale carbides, which may improve strength and toughness. These nanoscale carbides are likely to be different than the $M_2C$ (where M can be Cr, Mo or V) which require secondary heat treatment to precipitate.

The phenomenon called 'auto-tempering' causes the tempering of martensite during the cooling cycle without the need of any secondary heat treatment. During additive manufacturing, the auto-tempering effect phenomenon may take place during the inherent cooling cycle of the build samples to room temperature after solidification of laser melted powders. The auto-tempering effect is closely dependent on the onset temperature for martensite transformation in the alloy. Higher Ms temperature results in the freshly transformed martensite spending longer time at higher aging temperatures during the cooling cycle and thus resulting in increased auto-tempering effects. Auto-tempering of martensite can result in nanoscale carbide precipitation and recovery of quenched stress that can provide toughness improvement. In some instances, and subject to market pricing, exemplary alloys can have lower raw material costs in terms of alloying elements as compared to Navy 10Ni and/or BlastAlloy 160 alloys.

I. Example Steel Alloys

Example steel alloys are described below regarding example components and amounts, phase and nanostructure characteristics, and physical properties. Exemplary steel alloys may be nano-carbide strengthened steel that show a combination of high strength and high toughness in an as-printed additively manufactured condition. The alloy microstructure can be primarily martensitic with precipitation of nanoscale carbides, which can lead to improvement in strength and toughness. As a result, exemplary alloys can have better strength and toughness properties in direct printed condition which are better than those obtained in promising naval steels (Navy 10Ni steel and BlastAlloy 160 (BA160)) in wrought condition with application of secondary heat treatment.

In some instances, exemplary alloys use nickel (Ni) for lowering the ductile to brittle transition temperature thereby improving resistance to cleavage fracture. The carbon (C) content of exemplary alloys can help provide additional strengthening attributable to nanoscale carbide precipitation while limiting the carbon (C) content to obtain a sufficiently low Carbon Equivalent (CE) necessary for maintaining weldability. Chromium (Cr) and manganese (Mn) content of exemplary alloys can help maintain sufficient hardenability and high enough martensite start temperature to ensure auto-tempering effects in martensite.

Some embodiments may include one or more of lanthanum (La), boron (B) and titanium (Ti), which, when included in exemplary alloys, can capture harmful impurities such as sulfur (S) and phosphorus (P) and can also provide grain pinning particle dispersions. Lanthanum may be added to capture harmful sulfur, oxygen and phosphorus content in the steel in form of the stable phosphate ($LaPO_4$) and oxysulphide ($La_2O_2S$) compounds that would help in pinning grain boundaries for grain size refinement. Boron may be added to further improve the hardenability of the steel to ensure martensite formation at end of L-PBF deposition. Titanium may be added to help capture the dissolved nitrogen in the alloy in form of fine titanium nitride precipitates.

A. Example Components and Amounts

Exemplary steel alloys disclosed and contemplated herein may include various components at various amounts. For instance, example steel alloys can include iron and one or more of: carbon (C), nickel (Ni), manganese (Mn), and chromium (Cr). In some instances, example steel alloys can additionally include one or more of: lanthanum (La), boron (B) and titanium (Ti). Example steel alloys are usually molybdenum-free.

Example steel alloys can include carbon. For instance, exemplary steel alloys can include, by weight, 0.05% to 0.15% carbon (C). In various implementations, exemplary steel alloys can include, by weight, 0.05% to 0.13% C; 0.07% to 0.15% C; 0.05% to 0.11% C; 0.07% to 0.13% C; 0.09% to 0.15% C; 0.05% to 0.09% C; 0.06% to 0.10% C; 0.07% to 0.11% C; 0.11% to 0.15% C; 0.05% to 0.07% C; 0.07% to 0.09% C; 0.09% to 0.11% C; 0.11% to 0.13% C; 0.13% to 0.15% C.

Example steel alloys can include nickel. For instance, exemplary steel alloys can include, by weight, 5.0% to 10.0% nickel (Ni). In various implementations, exemplary steel alloys can include, by weight, 5.0% to 9.0% Ni; 6.0% to 10.0% Ni; 5.0% to 8.0% Ni; 6.0% to 9.0% Ni; 7.0% to 10.0% Ni; 6.5% to 9.0% Ni; 7.0% to 9.5% Ni; 5.0% to 7.0% Ni; 7.0% to 9.0% Ni; 8.0% to 10.0% Ni; 8.0% to 9.0% Ni; 8.5% to 9.5% Ni; or 8.75% to 9.25% Ni.

Example steel alloys can include manganese. For instance, example steel alloys can include, by weight, 0.2% to 1.0% manganese (Mn). In various implementations, example steel alloys can include 0.2% to 0.9% Mn; 0.3% to 1.0% Mn; 0.2% to 0.8% Mn; 0.3% to 0.9% Mn; 0.4% to 1.0% Mn; 0.2% to 0.7% Mn; 0.3% to 0.8% Mn; 0.4% to 0.9% Mn; 0.5% to 1.0% Mn; 0.2% to 0.5% Mn; 0.3% to 0.5% Mn; 0.4% to 0.7% Mn; 0.6% to 0.9% Mn; 0.2% to 0.4% Mn; 0.4% to 0.6% Mn; 0.6% to 0.8% Mn; or 0.8% to 1.0% Mn.

Example steel alloys can include chromium. For instance, example steel alloys can include, by weight, 0.5% to 1.5% chromium (Cr). In various implementations, example steel alloys can include, by weight, 0.5% to 1.3% Cr; 0.6% to 1.4% Cr; 0.7% to 1.5% Cr; 0.5% to 1.1% Cr; 0.7% to 1.3% Cr; 0.9% to 1.5% Cr; 0.5% to 0.9% Cr; 0.7% to 1.1% Cr; 0.8% to 1.2% Cr; 1.1% to 1.5% Cr; 0.5% to 0.7% Cr; 0.7% to 0.9% Cr; 0.9% to 1.1% Cr; 1.1% to 1.3% Cr; 1.3% to 1.5% Cr; or 0.8% to 0.9% Cr.

In some instances, example steel alloys may include lanthanum. For instance, example steel alloys may include, by weight, up to 0.1% lanthanum (La); up to 0.075% La; up to 0.05% La; up to 0.025% La; or up to 0.01% La. In certain instances, example steel alloys may include, by weight, 0.01% to 0.1% La; 0.01% to 0.05% La; 0.05% to 0.1% La; 0.03% to 0.06% La; or 0.025% to 0.075% La. In some instances, example steel alloys may include, by weight, no more than 0.05% La; no more than 0.01% La; or no more than 0.001% La.

In some instances, example steel alloys may include boron. For instance, example steel alloys may include, by weight, up to 0.004% boron (B); up to 0.003% B; up to 0.002% B; or up to 0.001% B. In certain instances, example steel alloys may include 0.001% to 0.004% B; 0.001% to 0.003% B; or 0.002% to 0.004% B. In some instances, example steel alloys may include, by weight, no more than 0.001% B; no more than 0.002% B; or no more than 0.003% B.

In some instances, example steel alloys may include titanium. For instance, example steel alloys may include, by weight, up to 0.03% titanium (Ti); up to 0.02% Ti; up to 0.01% Ti; or up to 0.001% Ti. In certain instances, example steel alloys may include 0.005% to 0.03% Ti; 0.001% to 0.02% Ti; or 0.01% to 0.03% Ti. In some instances, example steel alloys may include no more than 0.02% Ti; no more than 0.01% Ti; or no more than 0.001% Ti.

Typically, example steel alloys are molybdenum-free. For instance, example steel alloys can include, by weight, less than 0.01% molybdenum (Mo); less than 0.001% Mo; and less than 0.0001% Mo.

Typically, example steel alloys are vanadium-free. For instance, example steel alloys can include, by weight, less than 0.01% vanadium (V); less than 0.001% V; and less than 0.0001% V.

Typically, example steel alloys are silicon-free. For instance, example steel alloys can include, by weight, less than 0.01% silicon (Si); less than 0.001% Si; and less than 0.0001% Si.

In some instances, example steel alloys may include one or more incidental elements and impurities. Incidental elements and impurities in the disclosed steel alloys may include, but are not limited to, silicon, vanadium, niobium, aluminum, copper elements adhering to raw material stock, or mixtures thereof. Incidental elements and impurities may be present in the alloys disclosed herein in amounts totaling no more than 0.1 wt %, no more than 0.05 wt %, no more than 0.01 wt %, or no more than 0.001 wt %.

It is understood that the alloys described herein may consist only of the above-mentioned constituents, may consist essentially of such constituents, or, in other embodiments, may include additional constituents.

Example steel alloys can include components discussed above in various combinations of amounts. For instance, example steel alloys can include, by weight, 0.05% to 0.15% carbon, 5.0% to 10.0% nickel, 0.2% to 1.0% manganese, 0.5% to 1.5% chromium, less than 0.001% molybdenum, and the balance of weight percent comprising iron and incidental impurities. In some instances, example steel alloys can include, by weight, 0.07% to 0.09% carbon, 8.0% to 10.0% nickel, 0.4% to 0.6% manganese, 0.8% to 1.2% chromium, less than 0.001% lanthanum, less than 0.001% boron, less than 0.001% titanium, less than 0.0001% molybdenum, less than 0.001% silicon, and less than 0.001% vanadium. Other amounts are contemplated.

B. Example Phase and Nanostructure Characteristics

Exemplary alloys can have various phase and nanostructure characteristics in powder form and after being subjected to an additive manufacturing process (also referred to as "as-built").

Certain instances of exemplary steel alloys can have, relative to a 10-Ni alloy, increased martensite start temperature ($M_s$). As an example, certain exemplary steel alloys can have Ms values greater than 400° C. compared to reported Ms temperature of ~330° C. for 10-Ni alloy. The higher martensite start temperature can increase the auto-tempering effect during the cooling cycle of additive manufacturing process resulting in enhanced mechanical properties such as toughness. The higher Ms temperature also reduces the final retained austenite content in the alloy, thus eliminating the need of any cryogenic treatment to obtain higher yield strength values. In some instances, exemplary alloys can have a retained austenite content of less than 5% by volume, as determined by ASTM E975-13.

In some instances, after being subjected to an additive manufacturing process, exemplary alloys can have a majority martensitic structure. In some instances, after being subjected to an additive manufacturing process, the martensitic structure can include fine distribution of epsilon (ε) carbides or other precursor carbides.

The exemplary alloys can have a very refined grain size due to the additive manufacturing process resulting in very fine martensitic lath size. The alloy under as-built condition can have a homogenous compositional distribution with no significant segregation of any alloying addition.

C. Example Mechanical Properties

Exemplary alloys can have various mechanical properties in powder form and after being subjected to an additive manufacturing process (also referred to as "as-built" or "as-printed" condition). Mechanical properties discussed below can vary depending upon specifics of the additive manufacturing process, such as power, scan rate, scan spacing, build height, build thickness, etc. The following mechanical properties may be obtained after additive manufacturing under a laser power of 200 W, scan speed 600 mm/s, and scan spacing of 0.1 mm.

Example steel alloys, after being subjected to an additive manufacturing process, can have a density higher than 99.95% i.e. porosity less than 0.05%.

Example steel alloys, after being subjected to an additive manufacturing process, can result in builds with no observable hot cracking.

Example steel alloys, after being subjected to an additive manufacturing process, can have a yield strength of 1000 MPa to 1055 MPa. In various implementations, example steel alloys in as-built condition can have a yield strength of at least 1000 MPa; at least 1010 MPa; at least 1020 MPa; at least 1030 MPa; at least 1040 MPa; or at least 1050 MPa. In various implementations, example steel alloys in as-built condition can have a yield strength of 1000 MPa to 1055 MPa; 1010 MPa to 1050 MPa; 1010 MPa to 1055 MPa; or 1030 MPa to 1055 MPa.

Example steel alloys, after being subjected to an additive manufacturing process, can have an elongation of up to 19%. In various implementations, example steel alloys, after being subjected to an additive manufacturing process, can have an elongation of at least 15%; at least 17%; or at least 19%. In various implementations, example steel alloys, after being subjected to an additive manufacturing process, can have an elongation of 15% to 19%; 17% to 19%; or 18% to 19%.

Example steel alloys, after being subjected to an additive manufacturing process, can have a fracture toughness of up to 217 Joules at −17.8° C. In various implementations, example steel alloys, after being subjected to an additive manufacturing process, can have a fracture toughness of at least 190 Joules at −17.8° C.; at least 197 Joules at −17.8° C.; at least 203 Joules at −17.8° C.; at least 210 Joules at −17.8° C.; or at least 217 Joules at −17.8° C. In various implementations, example steel alloys, after being subjected to an additive manufacturing process, can have a fracture toughness of 190 to 217 Joules at −17.8° C.; 197 to 217 Joules at −17.8° C.; 203 to 217 Joules at −17.8° C.; or 210 to 217 Joules at −17.8° C.

Example steel alloys, after being subjected to an additive manufacturing process, can have a fracture toughness of up to 217 Joules at −45.6° C. In various implementations, example steel alloys, after being subjected to an additive manufacturing process, can have a fracture toughness of at least 190 Joules at −45.6° C.; at least 197 Joules at −45.6° C.; at least 203 Joules at −45.6° C.; at least 210 Joules at −45.6° C.; or at least 217 Joules at −45.6° C. In various implementations, example steel alloys, after being subjected to an additive manufacturing process, can have a fracture toughness of 190 to 217 Joules at −45.6° C.; 197 to 217 Joules at −45.6° C.; 203 to 217 Joules at −45.6° C.; or 210 to 217 Joules at −45.6° C.

Example steel alloys, after being subjected to an additive manufacturing process, can have a fracture toughness of up to 190 Joules at −84.4° C. In various implementations, example steel alloys, after being subjected to an additive manufacturing process, can have a fracture toughness of at least 125 Joules at −84.4° C.; of at least 176 Joules at −84.4° C.; of at least 133 Joules at −84.4° C.; of at least 183 Joules at −84.4° C.; or at least 139 Joules at −84.4° C. In various implementations, example steel alloys, after being subjected to an additive manufacturing process, can have a fracture toughness of 125 to 190 Joules at −84.4° C.; 176 to 190 Joules at −84.4° C.; 125 to 183 Joules at −84.4° C.; or 183 to 190 Joules at −84.4° C.

II. Example Methods of Preparing Alloy Powders

Example steel alloys disclosed and contemplated herein can be fabricated into various input stock forms relevant to the additive manufacturing system of interest. For instance, example steel alloys disclosed and contemplated herein can be manufactured into atomized alloy powder using available atomization techniques such as inert gas atomization. Resulting atomized alloy powders can be used in powder-bed fusion and directed energy deposition systems.

An example method of manufacturing an atomized alloy powder includes melting elemental metal feedstock or pre-alloyed feedstock such that a desired chemistry is produced. In some combinations of elements disclosed above, when a desired chemistry reaches temperatures at or above temperatures where there is no solid material fraction in the melt, atomization processes should take place.

Example atomized alloy powders can have particles sized for a particular use and/or fabrication system. In some implementations, example atomized alloy powders include particles having diameters of from 20 µm to 63 µm.

III. Example Methods of Manufacture

Example steel alloys disclosed and contemplated herein can be used in additive manufacturing systems. Additive manufacturing is a process by which products are built in a layered fashion by selectively fusing metal using a computer-controlled energy source (e.g., laser, electron beam, weld torch, or the like). Additive manufacturing is also defined in ASTM F2792-12a entitled "Standard Terminology for Additively Manufacturing Technologies."

Example additive layer manufacturing processes include: selective laser sintering (also referred to as laser powder bed fusion) in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. Suitable additive manufacturing systems include the EOSINT M 280 Direct Metal Laser Sintering (DMLS) additive manufacturing system, available from EOS GmbH (Robert-Stirling-Ring 1, 82152 Krailling/Munich, Germany).

An exemplary method may include conducting additive manufacturing with an atomized alloy powder as described herein. For instance, and without limitation, the alloyed particles can include, by weight percentage, 0.05% to 0.15% carbon, 5.0% to 10.0% nickel, 0.2% to 1.0% manganese, 0.5% to 1.5% chromium, less than 0.001% molybdenum, and the balance iron and incidental impurities. After conducting additive manufacturing, a completed manufactured article may be removed.

In some implementations, direct metal laser sintering (DMLS) is used to produce articles comprising the disclosed and contemplated example steel alloys. During example processes, an atomized alloy powder may be spread in a bed and a laser is used to selectively melt and fuse regions of the bed. Articles of manufacture can be built in a layer-by-layer fashion by continually spreading and fusing layers of powder.

Typically, articles are ready for use after additive manufacturing and no post processing operations are necessary. That is, an exemplary method may include foregoing aging the manufactured article in a heated enclosure or container such as a furnace.

In some implementations, one or more post-processing operations can be performed after the additive manufacturing build process. For example, an as-built article of manufacture may be subjected to basic heat treatment for stress relief. For example, an as-built article of manufacture may be subjected to Stage I tempering, which can include the article being in a 200° C. environment for up to 1 hour followed by air cooling.

IV. Experimental Examples

Example experimental alloys were fabricated and the results are discussed below. In some instances, exemplary experimental alloys were evaluated in comparison to well-studied alloys.

A. Example Experimental Alloy Sample Preparation and Composition Analysis

An example experimental alloy composition as shown in Table 1 below was provided to an additive manufacturing powder manufacturer. The AM powder manufacturer supplied 75 kg of argon gas-atomized powder suitable for additive manufacturing by selective laser melting. Chemical analysis of the supplied powder is shown in Table 1 below.

TABLE 1

Example experimental alloy compostion design and measured values in powder and deposited additive manufacture (AM) build.

| Wt % | C | Ni | Mn | Cr | La | B | Ti | Other |
|---|---|---|---|---|---|---|---|---|
| Design | 0.08 | 9.0 | 0.5 | 1.0 | 0.045 | 0.0015 | 0.01 | 80 ppm O, 20 ppm N |
| Powder tolerance | ±0.02 | ±0.5 | ±0.3 | ±0.4 | max | max | max | 200 ppm N, 400 ppm O |
| Powder | 0.09 | 8.5 | 0.4 | 0.85 | <0.001 | <0.001 | 0 | 200 ppm O |
| Chem analysis ICP/IGA of XY build | 0.072 | 8.59 | 0.4 | 0.89 | — | — | <0.01 | 61 ppm O, 22 ppm N |
| Chemical Analysis ICP-IGA (Z sample from bottom of build) | 0.068 | 9.44 | 0.39 | 0.75 | | | — | 17 ppm O, 23 ppm N |

Then the procured powder was supplied to an additive manufacturer to build specimens for mechanical testing and microstructural characterization. The additive manufacturer built the specimens using supplied processing parameters (Laser power 200 W, scan speed 600 mm/s, scan spacing 0.1 mm). The supplied powder was used to build in XY orientation, z-orientation, and 45-degree orientation: 8 specimens for Charpy tests, 3 samples for tensile testing and 2 cubes for microstructural investigations. FIG. 1 shows schematic depictions of an "xy" build, a "z" build, and a "45°" build for experimental samples. Exemplary "z build" alloys tested were oriented perpendicular to the build plate and 45° angle builds were oriented at a 45° angle to the build plate.

Figure 2:
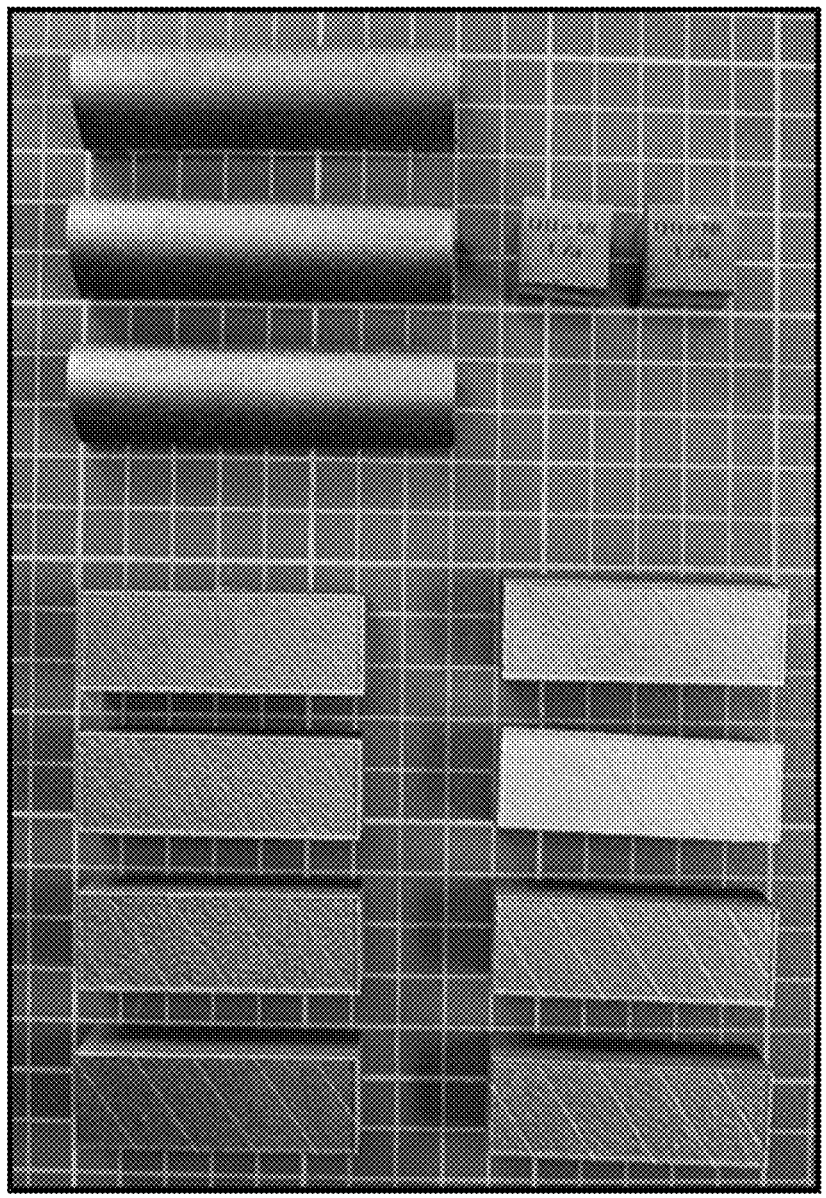
FIG. 2 is a photograph of the resultant builds shown schematically in FIG. 1.

A photograph of the actual built specimens is shown in FIG. 2. The as-built material chemistry was evaluated using ICP/IGA analysis and is listed in Table 1, above. The chemical composition appears to be reasonably close to the designed composition. The nitrogen and oxygen content in the samples are also close to expected amounts.

B. Microstructural Characterization of as-Deposited Samples

Figure 3:
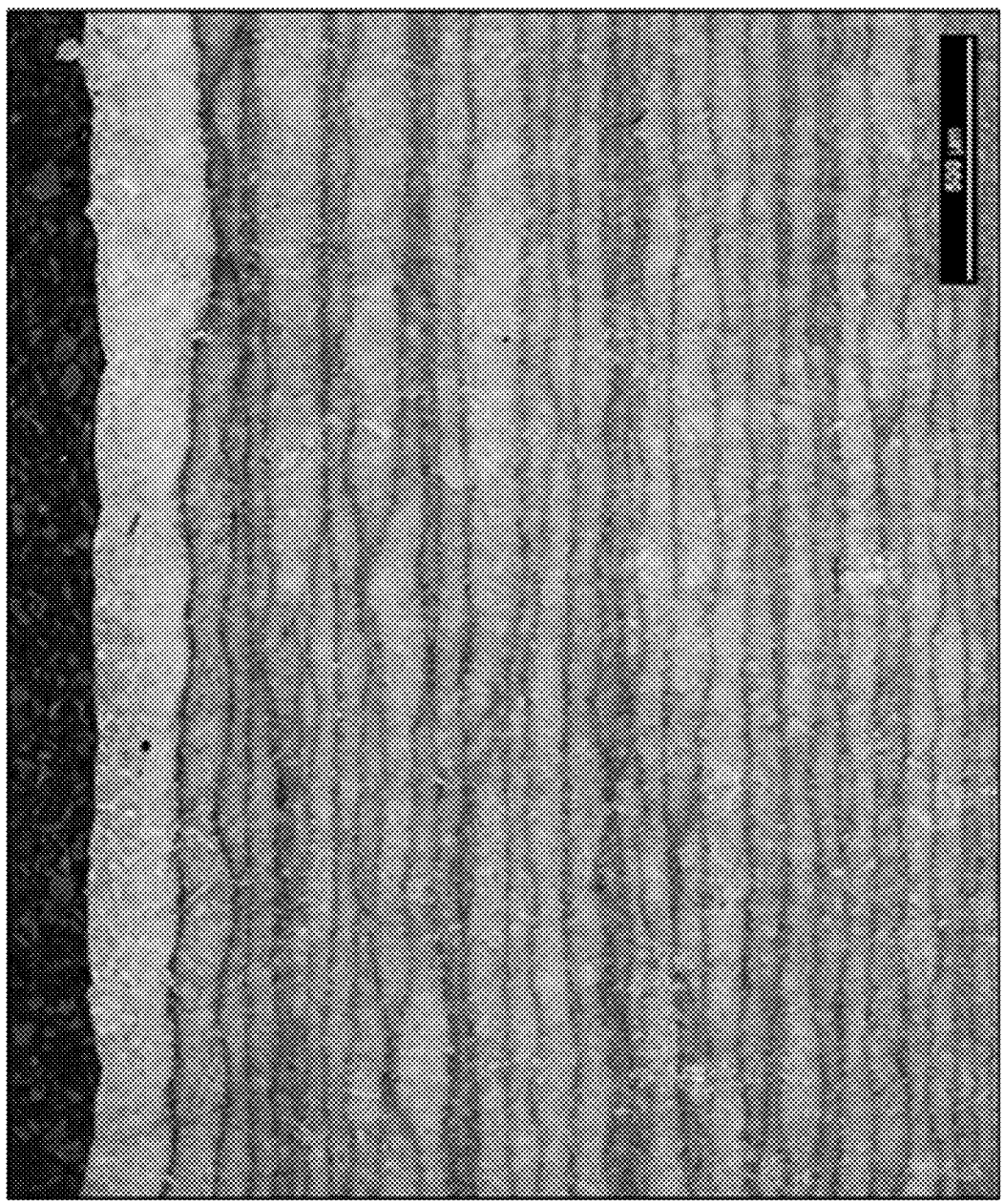
FIG. 3 is a light optical micrograph showing a microstructure (50× Magnification) for the as-built experimental alloy, where the build direction is vertically upwards.
Figure 4:
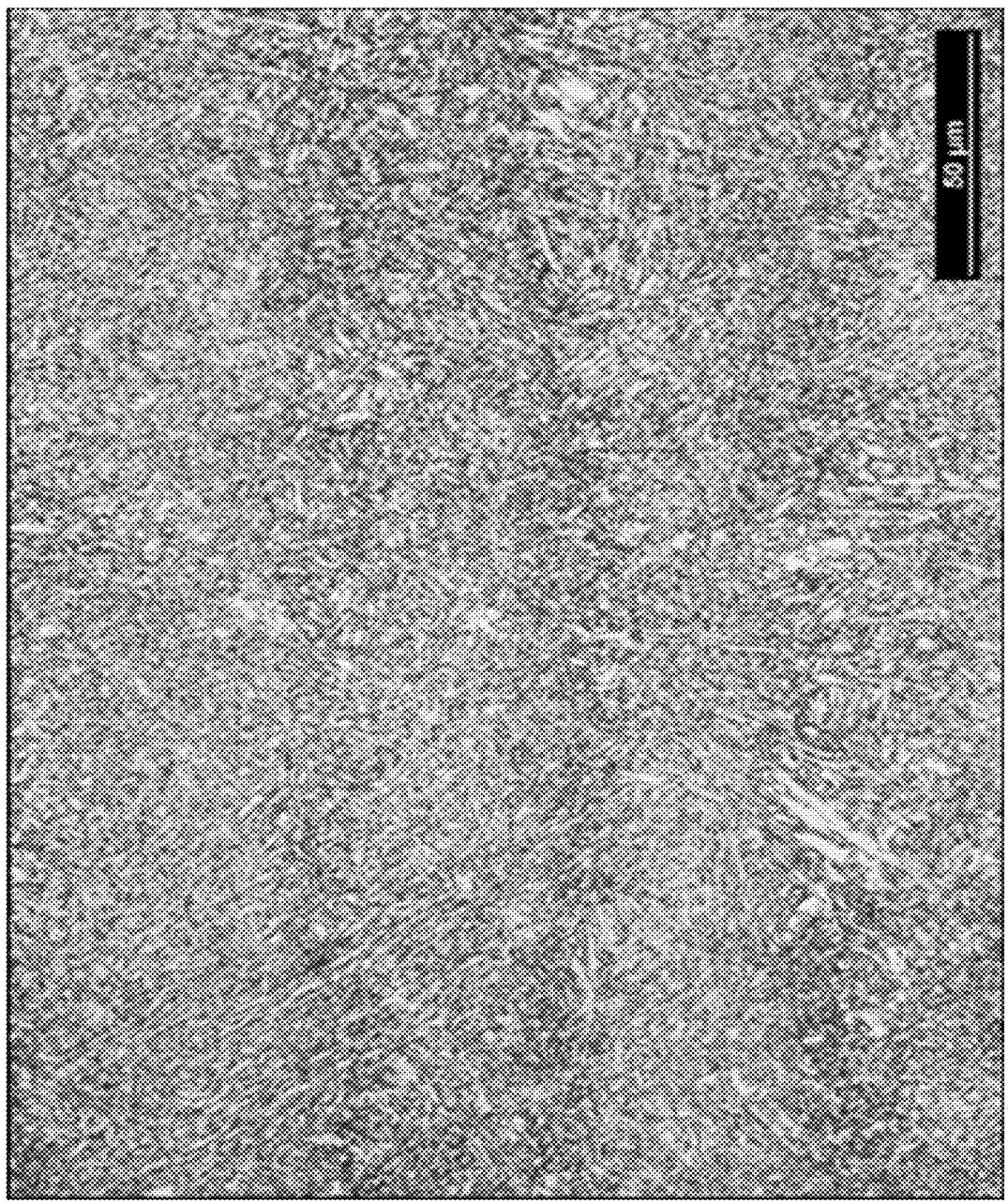
FIG. 4 is a light optical micrograph, at higher magnification (500×) than FIG. 3, showing a microstructure for the as-built experimental alloy, where the build direction is vertically upwards.
Figure 5B:
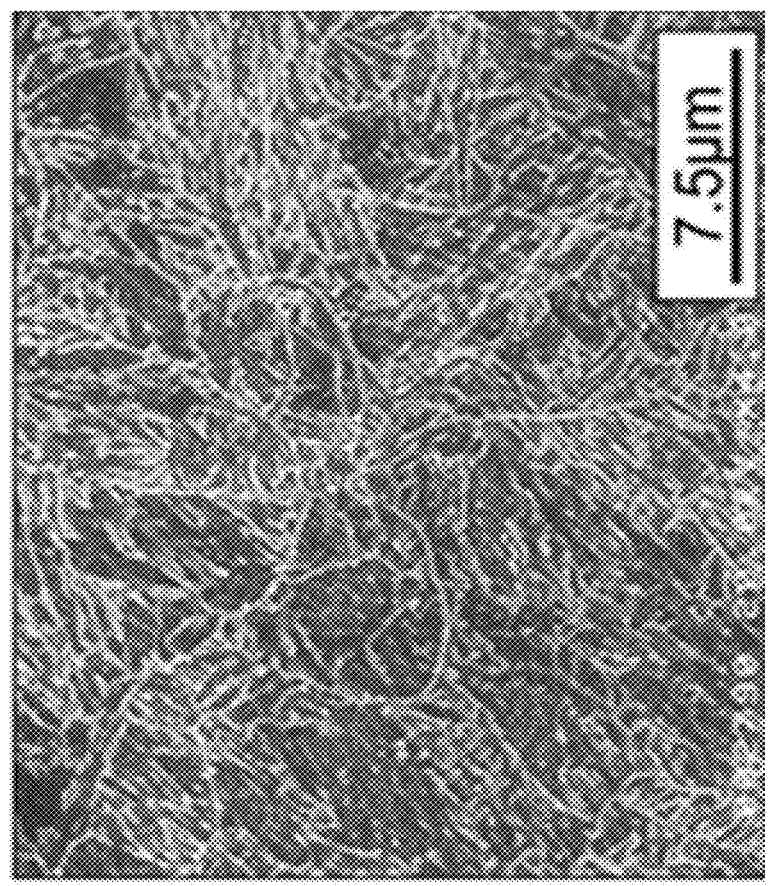
FIG. 5A and FIG. 5B are scanning electron microscopy (SEM) images of the experimental alloy showing a martensitic microstructure with carbide precipitation.
Figure 5A:
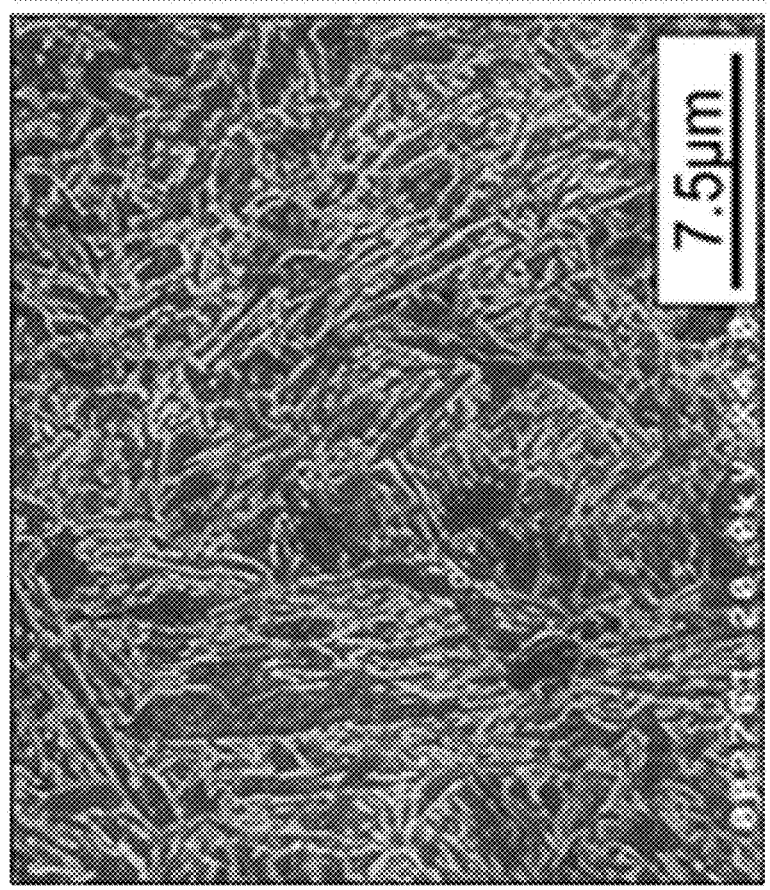
Figures 6A, 6B:
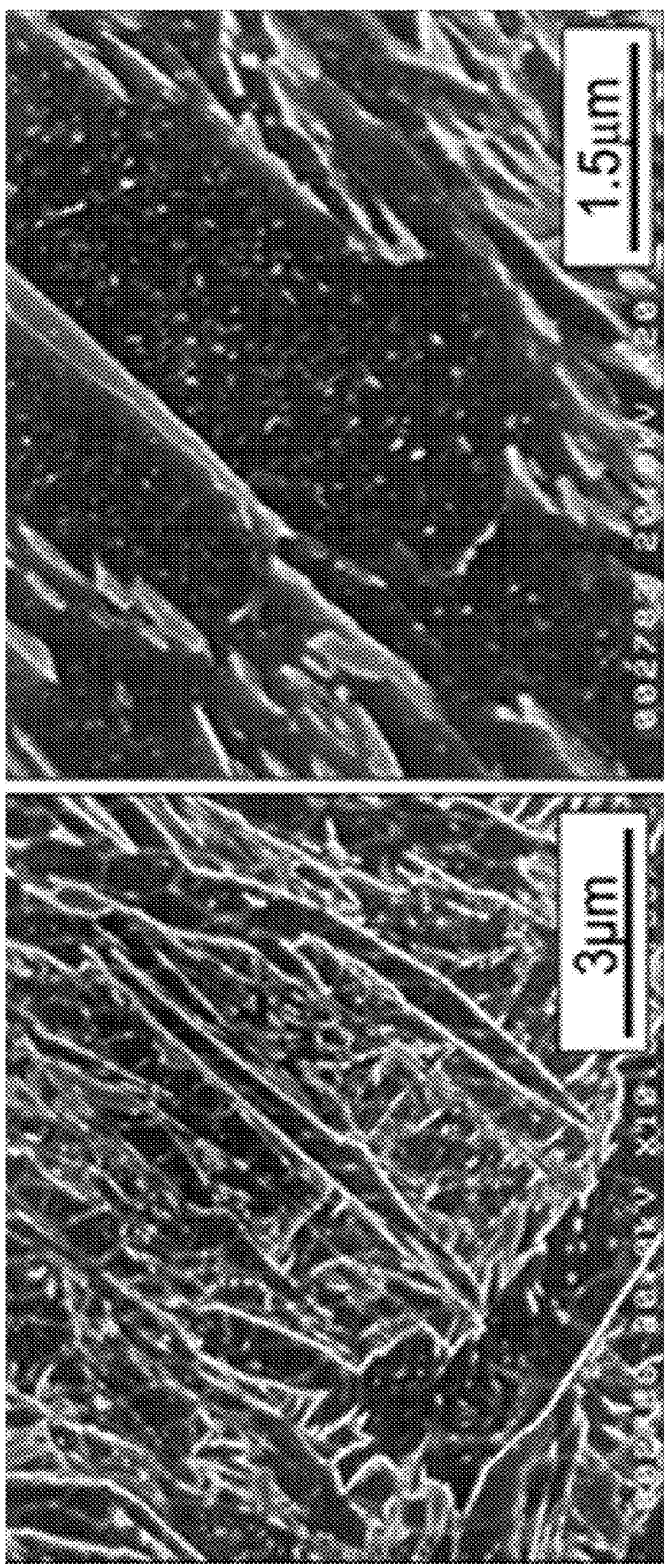
FIG. 6A and FIG. 6B are scanning electron microscopy (SEM) images of the experimental alloy showing a martensitic microstructure with carbide precipitation.

FIG. 3 and FIG. 4 are light optical microscopy (LOM) images on the 5% nital etched cross section of the xy build deposited samples, where the build direction was up. FIG. 3 and FIG. 4 appear to reveal a layered microstructure in the as-deposited condition. The average melt pool depth is seen to be slightly larger than the layer thickness of 40 microns used for making the samples. The etched microstructure in the LOM shows different colorations at the melt pool boundaries compared to the interior. This could be attributed to different size scale of microstructural features (ex. martensite lath size) or attributed to different amount of tempering/carbide precipitation.

Scanning electron microscopy performed on the 5% initial etched specimens revealed the martensitic microstructure with carbide precipitation as shown in FIG. 5A, FIG. 5B, FIG. 6A, and FIG. 6B. The lath martensite microstructure has a small fraction of retained austenite close to the lath boundaries along with fine carbides inside the laths. The size scale of the carbides is approximately ~50 nm and validates the designed nanocarbide strengthened steel microstructure.

Figure 7:
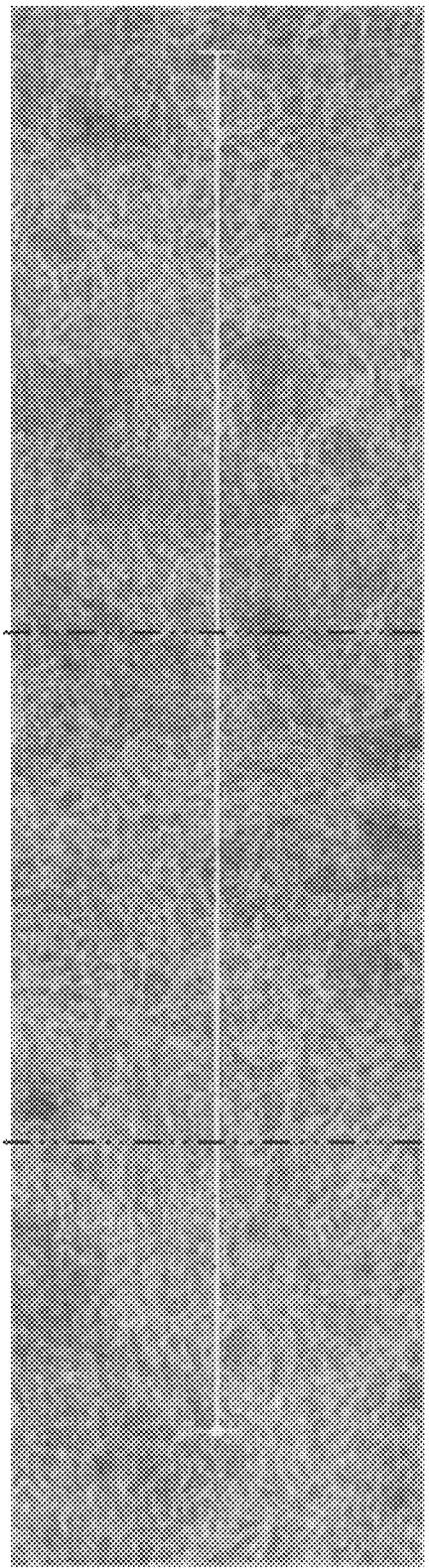
FIG. 7 is an image and plot of Energy Dispersive X-Ray Spectroscopy (EDS) line scans in SEM for the experimental alloy.
Figure 7:
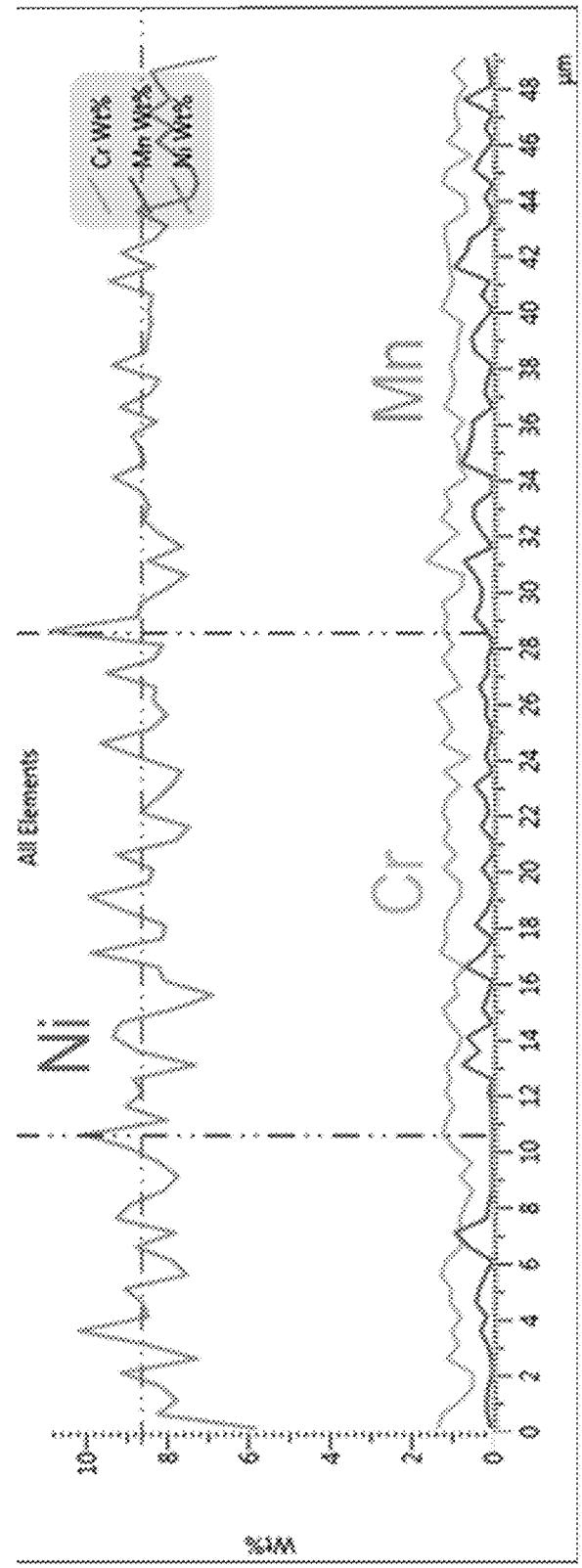

Energy Dispersive X-Ray Spectroscopy (EDS) line scans in SEM were carried out to investigate microsegregation that may be attributable to rapid solidification in the AM process. Long range scans (~50-micron length, FIG. 7A and FIG. 7B) showed no significant segregation of the alloying elements nickel, chromium, or manganese.

Figure 8:
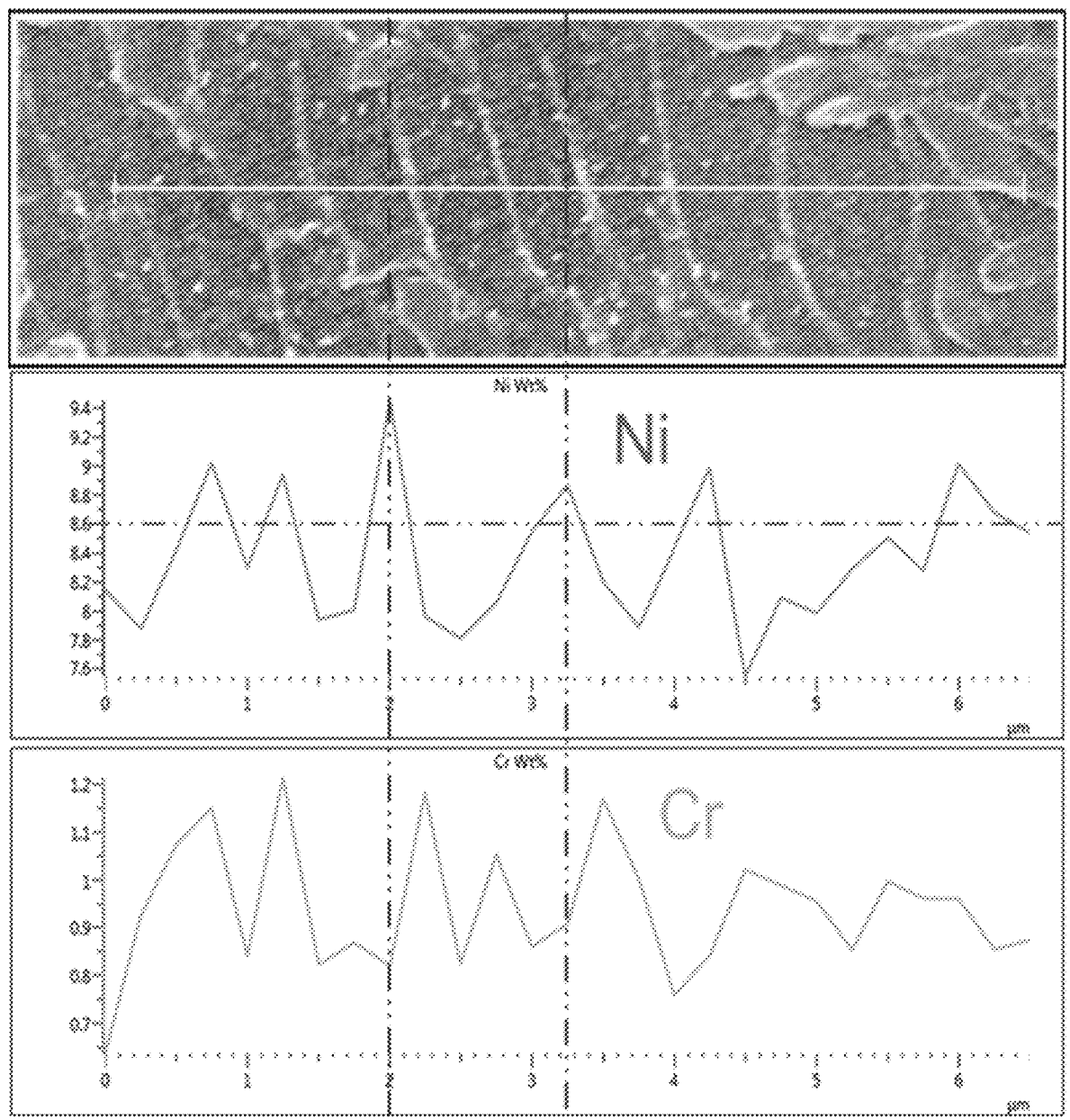
FIG. 8 is an image and plot of Energy Dispersive X-Ray Spectroscopy (EDS) line scans in SEM for the experimental alloy across boundaries and at higher magnification than those for FIG. 7.

Finer EDS line scans at higher magnification run across boundaries also showed no significant compositional variations as shown in FIG. 8. These could however be limited by the resolution capabilities of the instrument.

Figure 9:
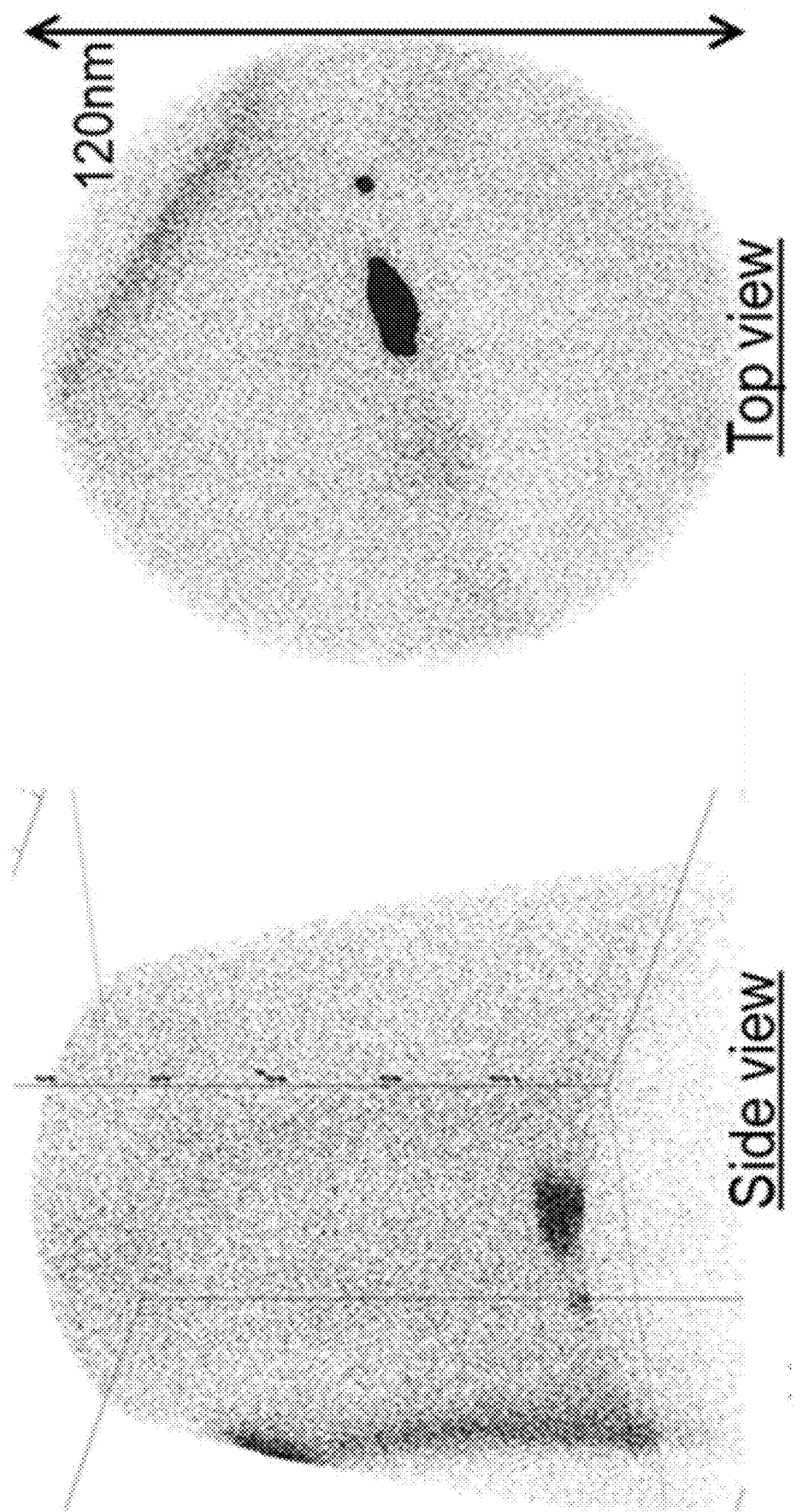
FIG. 9 is an ion map reconstruction generated from 3-Dimensional Atom Probe tomography (3D-APT) where carbon atoms are shown in black and the carbide particle is outlined by a 3 at % C iso-concentration surface.

3-Dimensional Atom Probe tomography (3D-APT) experiments were performed to identify precipitation of finer carbides/precipitates inside the martensite matrix. The ion map reconstructions in FIG. 9 show the carbon atoms in black and the carbide particle outlined by a 3 at % C iso-concentration surface. Segregation of carbon atoms to possibly lath boundaries or dislocations is observed. Finer scale nanocarbides resembling early stages of epsilon carbide precipitation are observed under these conditions.

Figure 10:
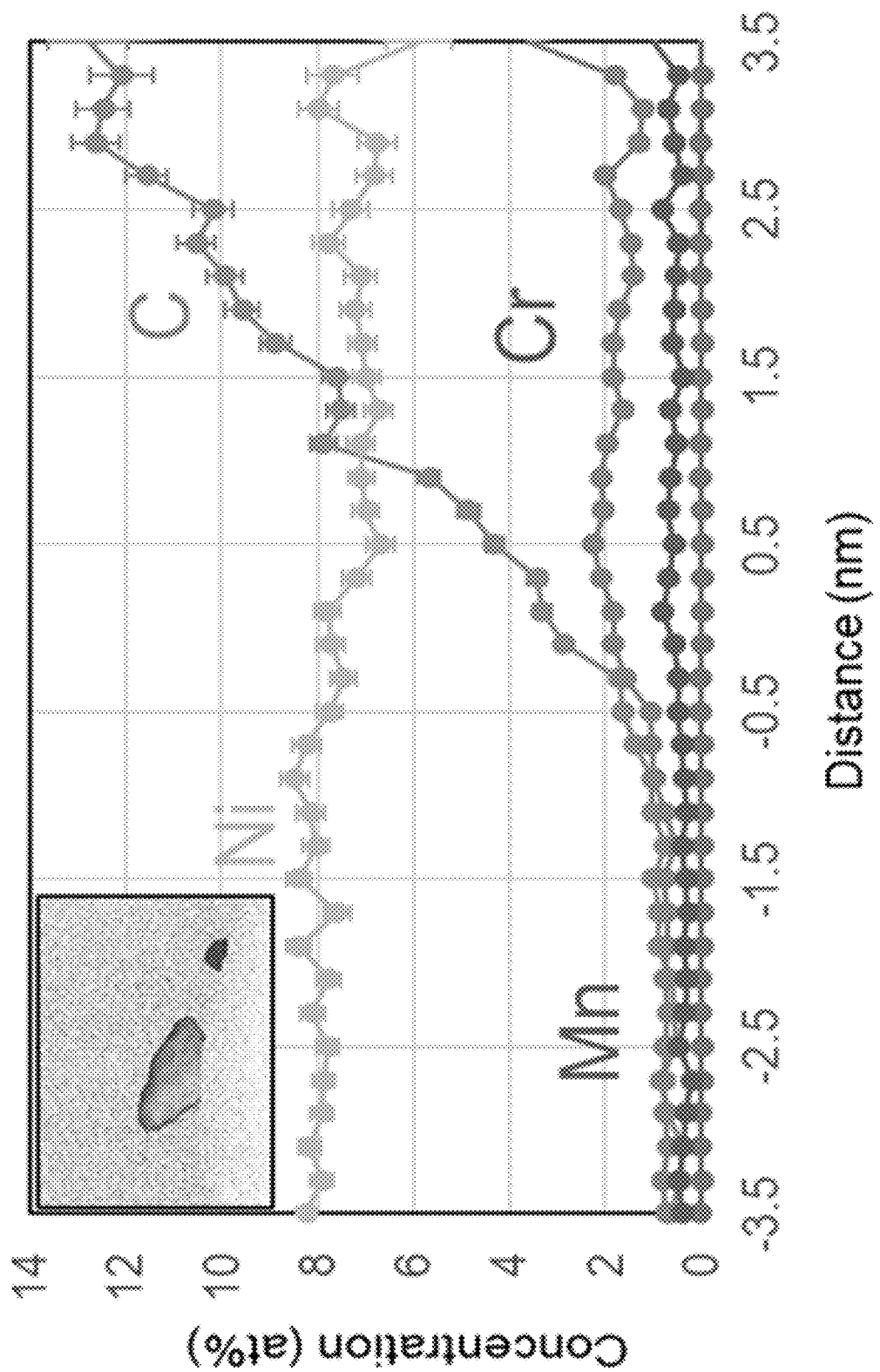
FIG. 10 is a proximity histogram showing averaged composition variation across a fine nanocarbide, where the inset shows a nanometer-sized carbide.

A proximity histogram showing averaged composition variation across the nanoscale carbide is shown in FIG. 10, where the averaged composition variation is perpendicular to the 3.5 wt % isoconcentration surface shown in the inset. The inset in FIG. 10 shows the finer nanoscale carbide to be about ~10 nm in size. The carbon content inside the carbide is measured to be about ~12 at. %. The nanocarbides are also found to be slightly depleted in Ni and enriched in Cr and Mn. Similar carbon content in APT analysis have been reported for low temperature aged Fe—Ni—C and 4340 steel. The finer scale precipitation was suggested to be a precursor to epsilon carbide precipitation in the reported steels.

An 8.9 cm tall z coupon having the alloy composition in Table 1 was sectioned into six slices of approximately equal shape and volume. Nominally, the six sections were labeled, starting from the build plate, as: B2, B1, M2, M1, T2, and T1 ("B" for bottom third, "M" for middle third, and "T" for top third). The build direction for the z coupon, as shown in FIG. 1, was up. A porosity analysis was conducted with image analysis program ImageJ at 50× magnification and twelve images were analyzed per sample. Results are shown below in Table 2.

TABLE 2

Average porosity for exemplary z-build with alloy in Table 1.

| Samples | Average Porosity (%) |
|---|---|
| T1 | 0.012 ± 0.007 |
| T2 | 0.027 ± 0.012 |
| M1 | 0.021 ± 0.05 |
| M2 | 0.016 ± 0.014 |
| B1 | 0.010 ± 0.006 |
| B2 | 0.011 ± 0.005 |

Figure 11A:
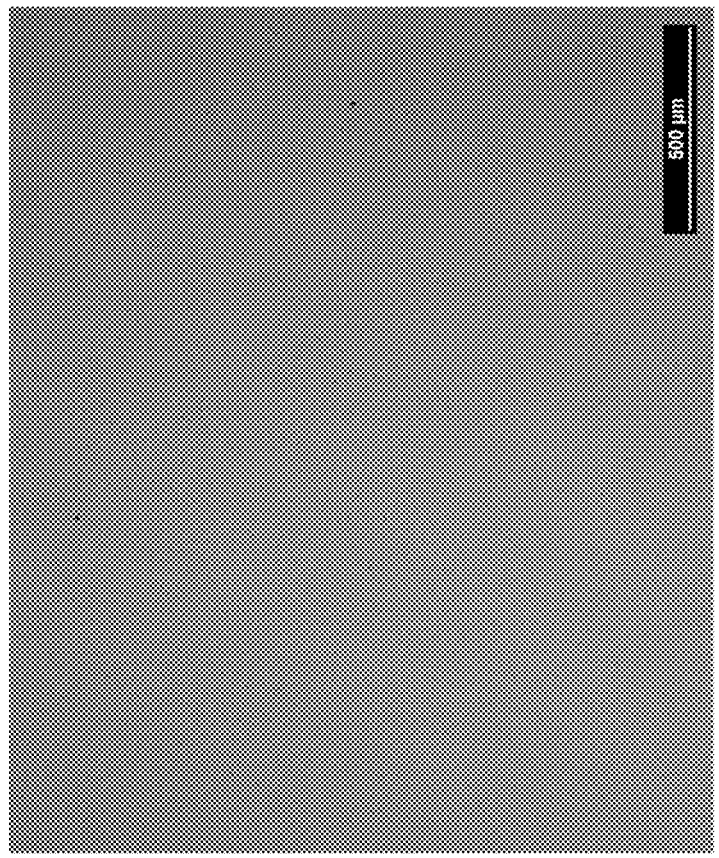
FIG. 11A and FIG. 11B are representative light optical microscope (LOM) images sections of an experimental z-build sample.
Figure 11B:
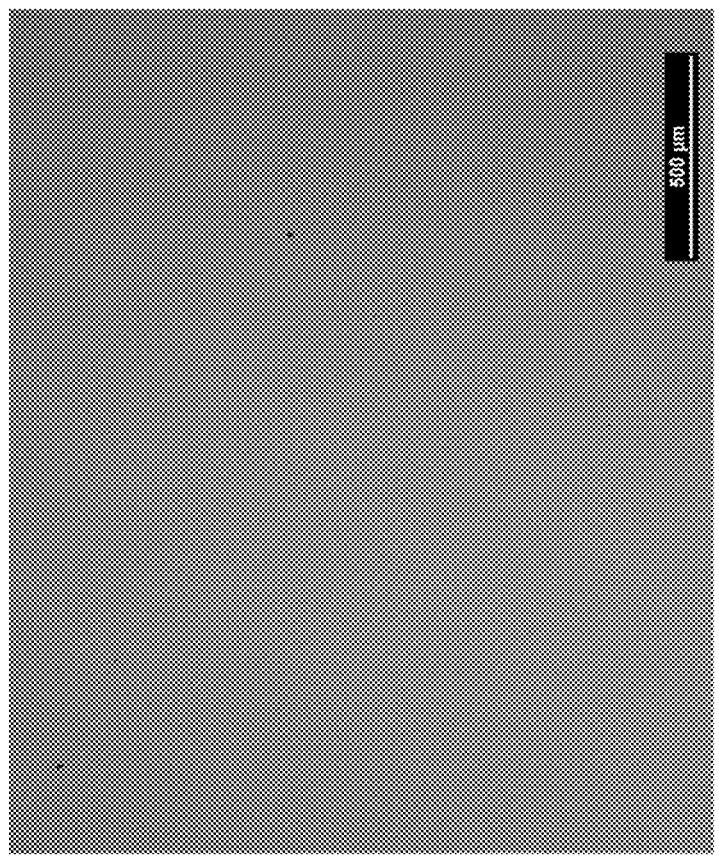

FIG. 11A and FIG. 11B are representative light optical microscope (LOM) images sections of a z-build sample's T1 and B2 sections, respectively. Low porosity was observed throughout the z-direction coupon.

Figures 12A, 12B, 12C:
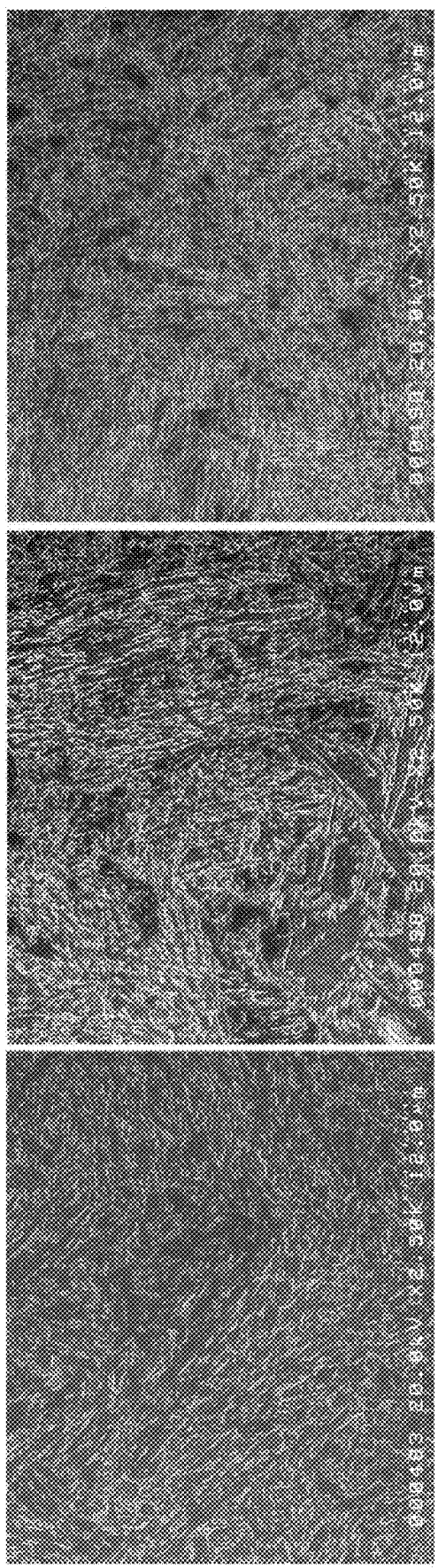
FIG. 12A, FIG. 12B, and FIG. 12C are scanning electron microscopy (SEM) images captured after etching the top, middle, and bottom sections, respectively, of an experimental z-build sample.

Top, middle, and bottom sections of the 8.9 cm tall z coupon were etched for a few seconds with Nital 1% (a mixture of 1 wt % nitric acid and alcohol). FIG. 12A, FIG. 12B, and FIG. 12C are scanning electron microscopy (SEM) images captured after etching the top, middle, and bottom sections, respectively. It may be observed that a finer microstructure exists towards the bottom of the coupon.

C. Mechanical Properties of as-Deposited Samples

1. Tensile and Charpy Testing

Uniaxial tensile testing of the as-deposited example experimental alloy samples was done to measure its room temperature yield, ultimate strength and ductility. Testing was performed according to ASTM E8 (2016) on 0.25 inch (0.635 cm) gauge diameter specimens.

Figure 13:
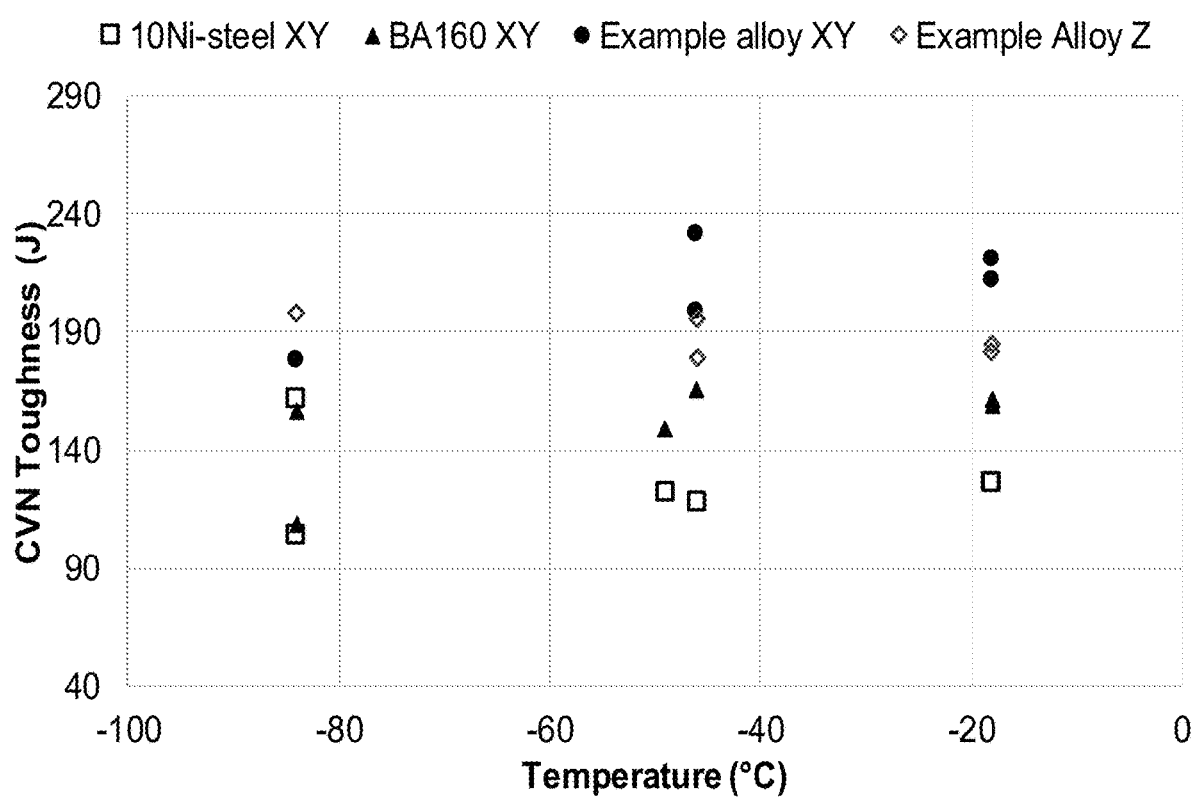
FIG. 13 shows temperature versus Charpy v-notch impact test results for experimental samples, each in the as-built condition, of 10Ni-steel (xy-build), BA-160 (xy-build), example alloy of Table 1 (xy-build) and example alloy of Table 1 (z-build).

Charpy v-notch impact testing was performed in accordance with ASTM E23 (2018) for experimental samples of BA-160 (xy-build), 10Ni-steel (xy-build), and the alloy shown in Table 1 (both xy-build and z-build). Each experimental sample was tested in as-built condition and the results are shown in FIG. 13. Charpy tests at three different test temperatures were performed to measure the toughness and its variation with test temperature.

The measured values are reported in Table 3. Also shown in Table 3 are results for additive manufacturing samples prepared with two alloys: BlastAlloy 160 (BA160) steel and 10Ni steel. Laser powder bed fabrication methods were used to make the AM articles.

TABLE 3

Mechanical properties measured for as-deposited additive manufacturing articles made with XY additive builds from an example steel alloy, BA160 steel and 10Ni steel.

| Alloy | Ultimate tensile strength (MPa) | 0.2% Yield strength (MPa) | Elongation (%) | Charpy toughness at −17.8° C. (Joules) |
|---|---|---|---|---|
| 10-Ni steel | 1207 | 1089 | 17 | 126 |
| BA160 steel | 1110 | 1082 | 15 | 160 |
| Example Experimental Alloy | 1082 | 1055 | 19 | 216 |

Wrought samples were also prepared using BA160 steel and 10-Ni steel. Strength and toughness values were experimentally obtained for both samples and results are shown in FIG. 13, which also includes strength and toughness values for the example experimental alloy.

Figure 14:
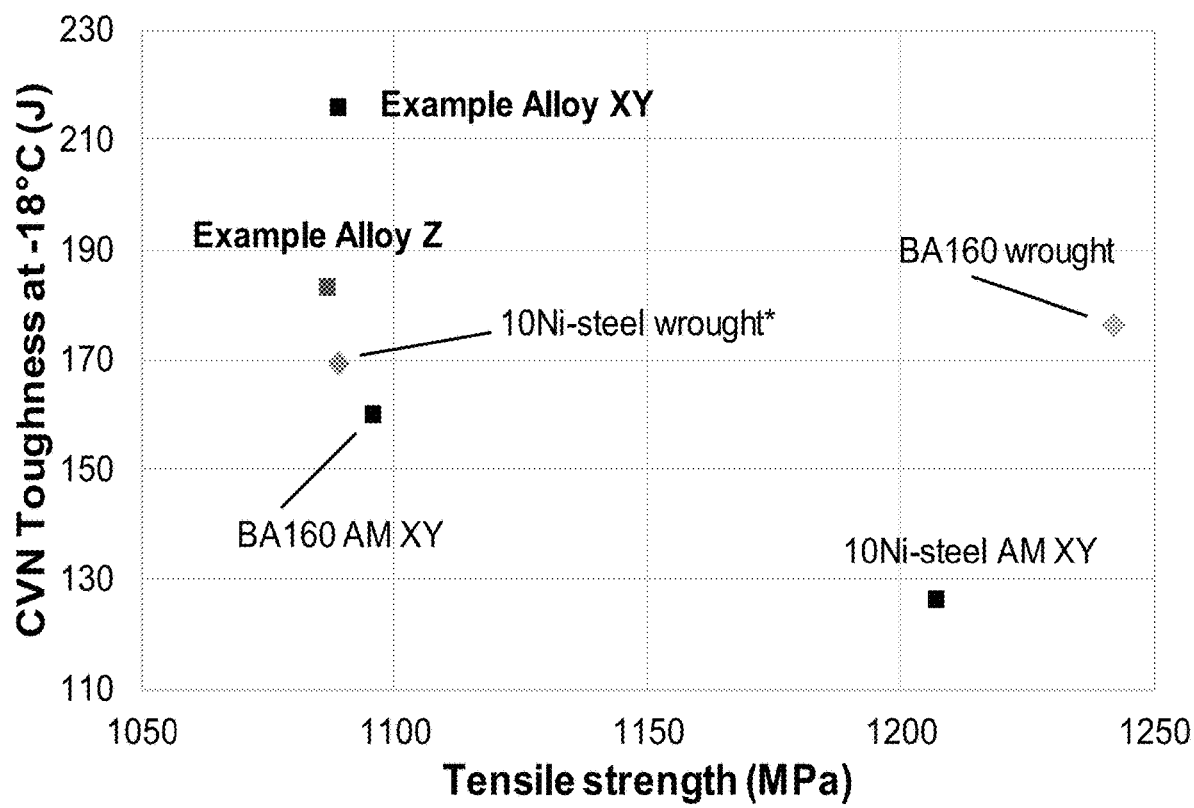
FIG. 14 shows tensile strength versus Charpy v-notch impact test results for the experimental samples shown in FIG. 13 as well as wrought BA-160 and an estimated 10Ni-steel wrought.

The variation of Charpy energy as a function of test temperature for the example experimental alloy is plotted in FIG. 14 along with measured values for 10-Ni steel and BA-160 steel. The data point for 10Ni-steel wrought is estimated based on data at −84° C. The measured strength of the example experimental alloy can be seen to be comparable to 10-Ni steel and BA160 alloys but with higher ductility. The Charpy impact energy values for the example experimental alloy is found to be much higher than 10-Ni steel or BA160 alloy which is quite promising.

Figure 15:
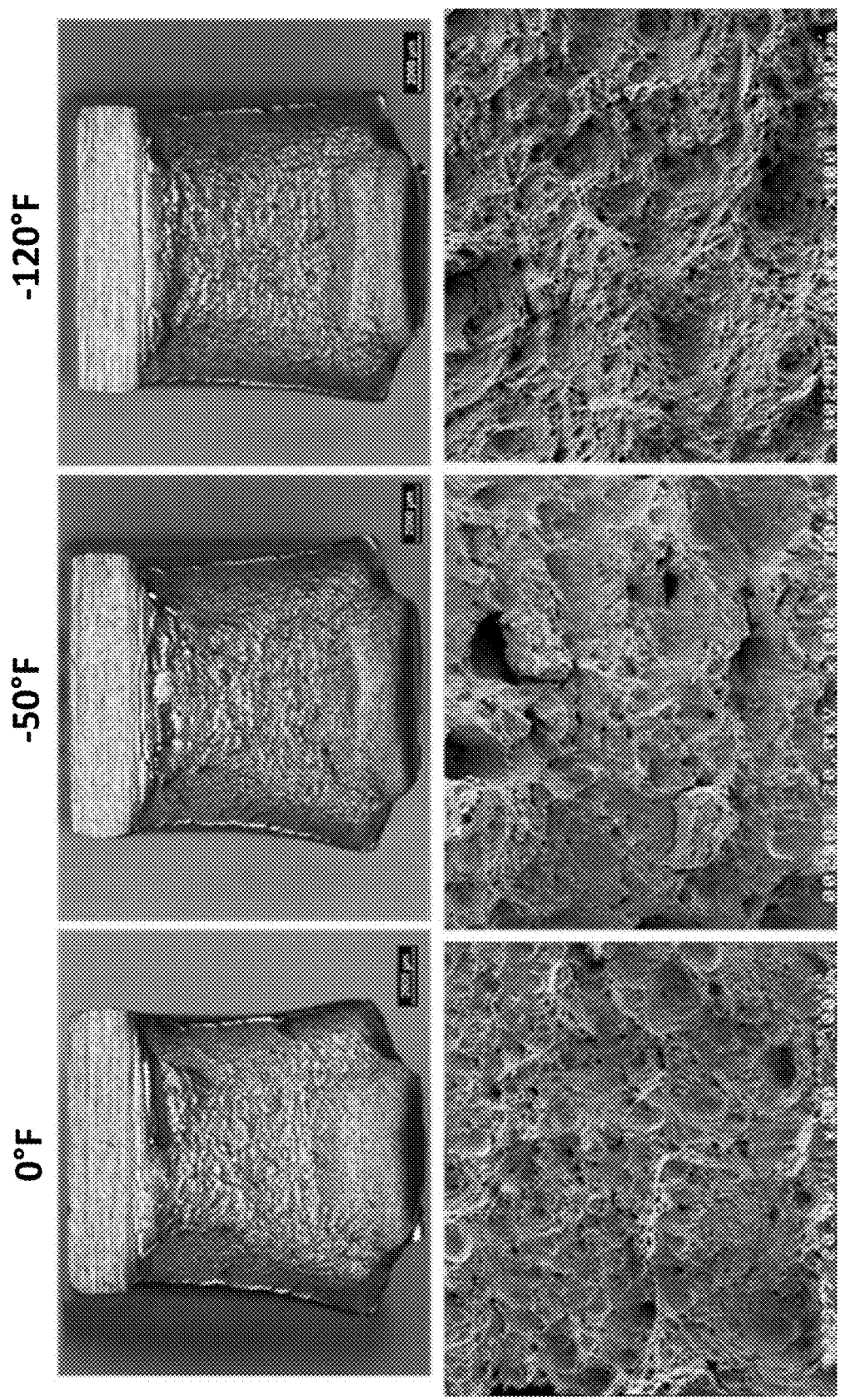
FIG. 15 is a series of stereoscope images and micrographs from the fracture surfaces for the experimental alloy taken at three test temperatures.

The ductile to brittle transition temperature (DBTT) temperature for the example experimental alloy is also seen to be quite low as high toughness values are retained down to the lowest test temperature of −84.4° C. Micrographs from the fracture surfaces for the example experimental alloy shown in FIG. 15 indicate fully ductile fracture at all test temperatures.

2. Retained Austenite Measurements

Figure 16A:
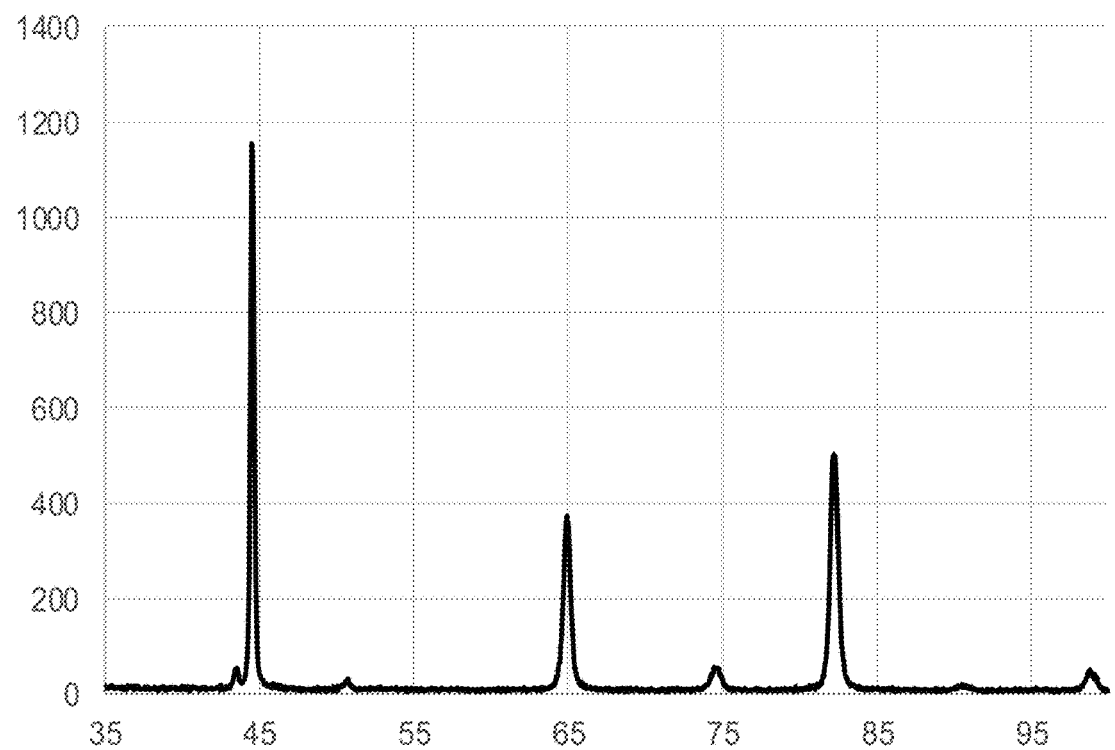
FIG. 16A and FIG. 16B show X-ray diffraction (XRD) spectra for XY build samples (1-inch cubes) looking at their XY direction (perpendicular to the build direction) and XZ direction (parallel to the build direction) faces, respectively.
Figure 16B:
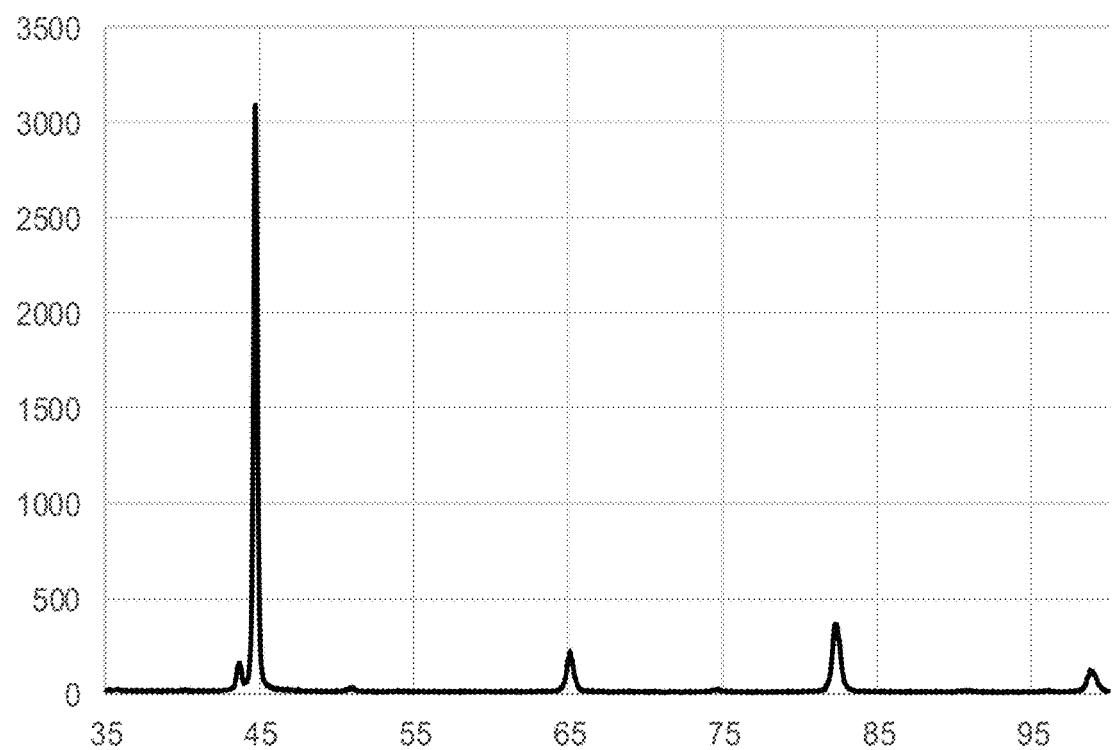

X-ray diffraction (XRD) was performed on a 1 inch (2.54 cm) cube coupon in as-built condition and following ASTM E975-13. The analysis included an xy sample (the plane perpendicular to the build direction) and a z sample (the plane parallel to the build direction). Measurements were obtained using a Scintag XDS 2000 diffractometer equipped with a 40 kV/20 mA Cu—K-α source. FIG. 16A shows the XRD pattern for the xy-build sample and FIG. 16B shows the XRD pattern for the z-build. The percentage of retained austenite measured on the XY and XZ plane of the Round 1 build cubes was determined to be 3.77% by volume and 4.08% by volume, respectively.

3. Martensite Start ($M_s$) Temperature Measurements

Dilatometry experiments were performed on experimental samples cylindrical in shape having a length of 10 millimeter (mm) and a diameter of 4 mm. Three alloys were tested: BA-160, 10Ni-steel, and the alloy shown in Table 1 above. The BA-160 and 10Ni-steel samples were xy-builds, and the experimental alloy of Table 1 was a z-build, which was sectioned into a top portion, a middle portion, and a bottom portion. During the tests, each sample was subjected to three cycles of austenization at 850° C. for up to 60 minutes and then a rapid controlled quench. Then the change in length was measured as a function of temperature. The martensite start ($M_s$) temperature was calculated as the average of the three measurements and results are shown in Table 4, below.

TABLE 4

Martensite start ($M_s$) temperature determined for experimental samples of BA-160, 10Ni-steel, and the alloy of Table 1.

| Ms Temp | BA-160 | 10Ni | Example Alloy | | |
|---|---|---|---|---|---|
| | | | Top | Middle | Bottom |
| Cycle 1 | 310° C. | 266° C. | 376° C. | 360° C. | 365° C. |
| Cycle 2 | 306° C. | 252° C. | 370° C. | 374° C. | 368° C. |
| Cycle 3 | 306° C. | 246° C. | 372° C. | 362° C. | 368° C. |
| Average | 307° C. | 255° C. | 373° C. | 365° C. | 367° C. |

4. As-Built Tensile Properties

Tensile properties were evaluated for various experimental samples generated in xy-build, 45° build, and z-build configurations. Alloy compositions for each sample are shown in Table 1, above. ASTM E8 (2016) was followed for 0.635 cm gauge diameter tensile specimens. Tensile tests were performed at room temperature, and a slight anisotropy was observed between the different build directions. Results of the tensile tests are shown in Table 5, below.

TABLE 5

Tensile properties for 0.635 cm gauge diameter xy-, 45°, and z-build specimens having the alloy shown in Table 1.

| Build direction | Build # | Ultimate tensile strength (MPa) | 0.2% Yield strength (MPa) | Elongation (%) | Reduction of area (%) | Modulus (GPa) |
|---|---|---|---|---|---|---|
| XY | 1 | 1085 | 1056 | 19 | 79 | 188 |
|  | 1 | 1082 | 1054 | 20 | 81 | 200 |
|  | 1 | 1083 | 1052 | 19 | 80 | 194 |
|  | 2 | 1101 | 1069 | 18 | 77 | 190 |
|  | 2 | 1094 | 1067 | 18 | 78 | 188 |
| 45 degrees | 2 | 1093 | 1049 | 19 | 78 | 223 |
|  | 2 | 1087 | 1037 | 19 | 77 | 199 |
| Z | 2 | 1084 | 1040 | 19 | 75 | 181 |
|  | 2 | 1089 | 1049 | 19 | 77 | 201 |

5. Heat Treatment Response

Figure 17:
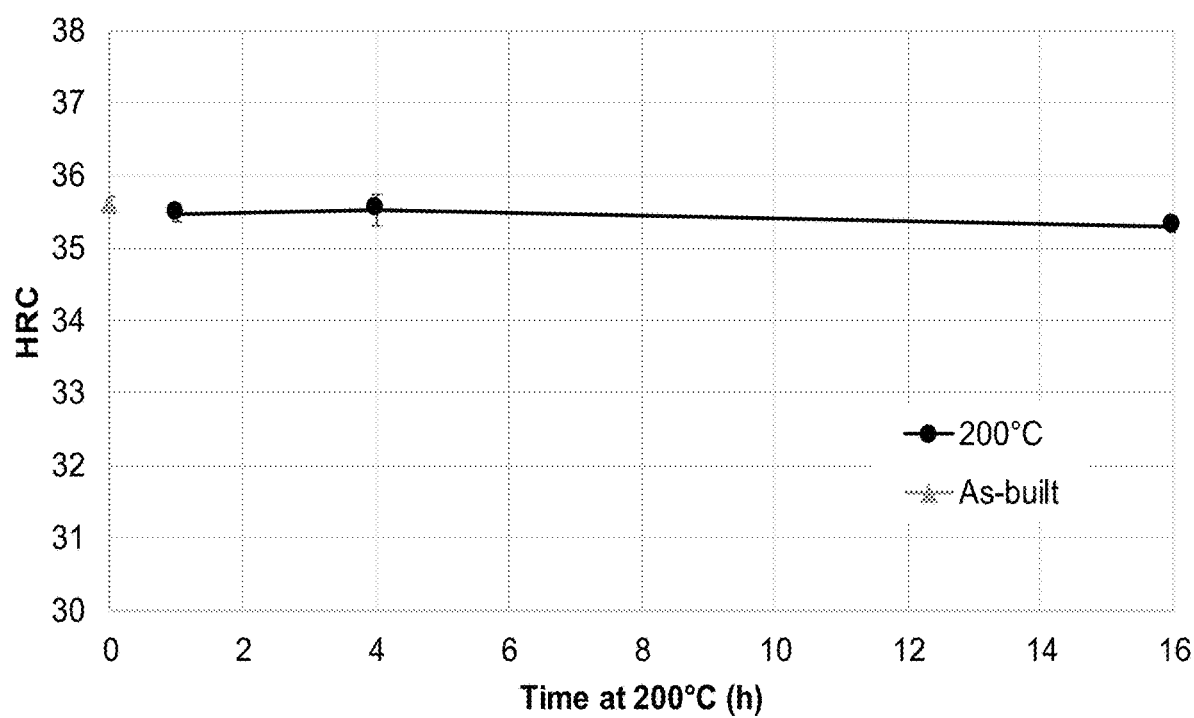
FIG. 17 shows hardness measurements of experimental samples of the alloy shown in Table 1 taken in as-built condition and after tempering at 200° C. for 1 hour, 4 hours, and 16 hours.

XY-build samples of the alloy shown in Table 1 were heat treated at 200° C. (Stage I temper) for 1 hour, 4 hours, and 16 hours. Hardness measurements were taken (Rockwell C, average of 5 datapoints) for the as-built sample and after 1 hour, 4 hours, and 16 hours of the heat treatment. Results of the hardness tests are shown in FIG. 17. It is observed that the hardness appears to be maintained over time.

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An alloy, comprising, by weight:
   0.05% to 0.15% carbon;
   7.0% to 10.0% nickel;
   0.2% to 1.0% manganese;
   0.5% to 1.5% chromium;
   less than 0.001% silicon;
   less than 0.01% aluminum;
   less than 0.001% molybdenum; and
   the balance iron and incidental impurities.

2. The alloy according to claim 1, further comprising, by weight:
   up to 0.1% lanthanum;
   up to 0.004% boron; and
   up to 0.03% titanium.

3. The alloy according to claim 2, comprising, by weight, 0.03% to 0.06% lanthanum.

4. The alloy according to claim 3, comprising, by weight, 0.001% to 0.003% boron.

5. The alloy according to claim 4, comprising, by weight, 0.001% to 0.02% titanium.

6. The alloy according to claim 2, comprising, by weight, less than 0.001% vanadium.

7. The alloy according to claim 1, comprising, by weight, less than 0.01% vanadium.

8. The alloy according to claim 1, comprising, by weight:
   0.07% to 0.09% carbon;
   8.0% to 10.0% nickel;
   0.4% to 0.6% manganese;
   0.8% to 1.2% chromium;
   less than 0.001% lanthanum;
   less than 0.001% boron;
   less than 0.001% titanium;
   less than 0.0001% molybdenum;
   less than 0.001% silicon; and
   less than 0.001% vanadium.

9. An atomized alloy powder usable in additive manufacturing, the atomized alloy powder comprising:
   alloy particles comprising, by weight:
   0.05% to 0.15% carbon;
   7.0% to 10.0% nickel;
   0.2% to 1.0% manganese;
   0.5% to 1.5% chromium;
   less than 0.001% silicon;
   less than 0.01% aluminum;
   less than 0.001% molybdenum; and
   the balance iron and incidental impurities.

10. The atomized alloy powder according to claim 9, wherein the alloy particles further comprise, by weight:
    up to 0.1% lanthanum;
    up to 0.004% boron; and
    up to 0.03% titanium.

11. The atomized alloy powder according to claim 9, wherein the alloy particles comprise, by weight,
    0.001% to 0.003% boron;
    0.001% to 0.02% titanium; and
    less than 0.01% vanadium.

12. The atomized alloy powder according to claim 9, wherein the alloy particles comprise, by weight:
    0.07% to 0.09% carbon;
    8.0% to 10.0% nickel;
    0.4% to 0.6% manganese;
    0.8% to 1.2% chromium;
    less than 0.001% lanthanum;
    less than 0.001% boron;
    less than 0.001% titanium;
    less than 0.0001% molybdenum;
    less than 0.001% silicon; and
    less than 0.001% vanadium.

13. A method of performing additive manufacturing, the method comprising:
    conducting additive manufacturing with an atomized alloy powder to generate a manufactured article, the atomized alloy powder comprising alloyed particles comprising, by weight percentage:
    0.05% to 0.15% carbon;
    7.0% to 10.0% nickel;
    0.2% to 1.0% manganese;
    0.5% to 1.5% chromium;
    less than 0.001% silicon;
    less than 0.01% aluminum;
    less than 0.001% molybdenum; and
    the balance iron and incidental impurities; and
    removing a completed manufactured article.

14. The method according to claim 13, wherein the completed manufactured article has a fracture toughness of up to 217 Joules at −45.6° C.

15. The method according to claim 14, wherein the completed manufactured article has a fracture toughness of up to 190 Joules at −84.4° C.

16. The method according to claim 15, wherein the completed manufactured article has a yield strength of 1000 MPa to 1055 MPa.

17. The method according to claim 13, further comprising:
- foregoing aging the manufactured article in a heated container,
- wherein the completed manufactured article has a density higher than 99.95%.

18. The method according to claim 13, wherein the alloyed particles comprise, by weight:
- 0.07% to 0.09% carbon;
- 8.0% to 10.0% nickel;
- 0.4% to 0.6% manganese;
- 0.8% to 1.2% chromium;
- less than 0.001% lanthanum;
- less than 0.001% boron;
- less than 0.001% titanium;
- less than 0.0001% molybdenum;
- less than 0.001% silicon; and
- less than 0.001% vanadium.

\* \* \* \* \*